(12) United States Patent
Rodriguez et al.

(10) Patent No.: US 11,734,234 B1
(45) Date of Patent: *Aug. 22, 2023

(54) DATA ARCHITECTURE FOR SUPPORTING MULTIPLE SEARCH MODELS

(71) Applicant: Experian Information Solutions, Inc., Costa Mesa, CA (US)

(72) Inventors: Mary Ann Ortega Rodriguez, Rancho Santa Margarita, CA (US); Helen Kaminsky, Irvine, CA (US); Manas Kumar Das, Irvine, CA (US); Maneesh Raswan, Irvine, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/176,971

(22) Filed: Feb. 16, 2021

Related U.S. Application Data

(63) Continuation of application No. 16/124,989, filed on Sep. 7, 2018, now Pat. No. 10,963,434.

(51) Int. Cl.
*G06F 16/21* (2019.01)
*G06F 16/27* (2019.01)
(Continued)

(52) U.S. Cl.
CPC .............. *G06F 16/212* (2019.01); *G06F 9/54* (2013.01); *G06F 16/245* (2019.01);
(Continued)

(58) Field of Classification Search
CPC ...... G06F 16/212; G06F 16/27; G06F 16/245; G06F 16/248; G06F 16/9535; G06F 9/54
See application file for complete search history.

(56) References Cited

U.S. PATENT DOCUMENTS 4,163,290 A   7/1979   Sutherlin et al.
4,827,508 A   5/1989   Shear
(Continued)

FOREIGN PATENT DOCUMENTS

AU   2004220812   9/2004
AU   2010200017   1/2010
(Continued)

OTHER PUBLICATIONS

U.S. Appl. No. 16/124,989, U.S. Pat. No. 10,963,434, Data Architecture for Supporting Multiple Search Models, filed Sep. 7, 2018.
(Continued)

*Primary Examiner* — Etienne P Leroux
(74) *Attorney, Agent, or Firm* — Knobbe Martens Olson & Bear LLP

(57) ABSTRACT

Embodiments include a search and match computing system configured to: access, from a third party computing system, a query regarding at least one entity; determine if the query is a structured query or an unstructured query; process the query with at least one of an application programming interface configured to receive structured queries or a second application programming interface receive unstructured queries; initiate a search and match application configured to execute queries on at least one of: a relational data scheme or a non-relational data scheme; receive search results from the at least one of: the relational data scheme or the non-relational data scheme; and process the received search results to generate an output data packet for access by the third party computing system.

20 Claims, 10 Drawing Sheets

(51) Int. Cl.
*G06F 16/245* (2019.01)
*G06F 16/248* (2019.01)
*G06F 16/9535* (2019.01)
*G06F 9/54* (2006.01)

(52) U.S. Cl.
CPC ............ *G06F 16/248* (2019.01); *G06F 16/27* (2019.01); *G06F 16/9535* (2019.01)

(56) References Cited

U.S. PATENT DOCUMENTS

| | | |
|---|---|---|
| 4,868,570 A | 9/1989 | Davis |
| 4,935,870 A | 6/1990 | Burk, Jr. et al. |
| 4,989,141 A | 1/1991 | Lyons et al. |
| 5,216,612 A | 6/1993 | Cornett et al. |
| 5,247,575 A | 9/1993 | Sprague et al. |
| 5,274,547 A | 12/1993 | Zoffel et al. |
| 5,325,509 A | 6/1994 | Lautzenheiser |
| 5,341,429 A | 8/1994 | Stringer et al. |
| 5,528,701 A | 6/1996 | Aref |
| 5,555,409 A | 9/1996 | Leenstra, Sr. et al. |
| 5,590,038 A | 12/1996 | Pitroda |
| 5,621,201 A | 4/1997 | Langhans et al. |
| 5,629,982 A | 5/1997 | Micali |
| 5,630,070 A | 5/1997 | Dietrich et al. |
| 5,640,551 A | 6/1997 | Chu et al. |
| 5,640,577 A | 6/1997 | Scharmer |
| 5,655,129 A | 8/1997 | Ito |
| 5,659,731 A | 8/1997 | Gustafson |
| 5,666,528 A | 9/1997 | Thai |
| 5,692,107 A | 11/1997 | Simoudis et al. |
| 5,737,732 A | 4/1998 | Gibson et al. |
| 5,739,512 A | 4/1998 | Tognazzini |
| 5,748,098 A | 5/1998 | Grace |
| 5,754,632 A | 5/1998 | Smith |
| 5,754,939 A | 5/1998 | Herz et al. |
| 5,765,143 A | 6/1998 | Sheldon et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |
| 5,812,840 A | 9/1998 | Shwartz |
| 5,822,750 A | 10/1998 | Jou et al. |
| 5,822,751 A | 10/1998 | Gray et al. |
| 5,825,884 A | 10/1998 | Zdepski et al. |
| 5,828,837 A | 10/1998 | Eikland |
| 5,832,068 A | 11/1998 | Smith |
| 5,835,915 A | 11/1998 | Carr et al. |
| 5,842,185 A | 11/1998 | Chancey et al. |
| 5,844,218 A | 12/1998 | Kawan et al. |
| 5,881,131 A | 3/1999 | Farris et al. |
| 5,893,090 A | 4/1999 | Friedman et al. |
| 5,905,985 A | 5/1999 | Malloy et al. |
| 5,956,693 A | 9/1999 | Geerlings |
| 5,961,593 A | 10/1999 | Gabber et al. |
| 5,963,932 A | 10/1999 | Jakobsson et al. |
| 5,966,695 A | 10/1999 | Melchione et al. |
| 6,014,688 A | 1/2000 | Venkatraman et al. |
| 6,026,381 A | 2/2000 | Barton, III et al. |
| 6,038,551 A | 3/2000 | Barlow et al. |
| 6,070,147 A | 5/2000 | Harms et al. |
| 6,073,106 A | 6/2000 | Rozen et al. |
| 6,073,140 A | 6/2000 | Morgan et al. |
| 6,085,242 A | 7/2000 | Chandra |
| 6,119,103 A | 9/2000 | Basch et al. |
| 6,121,901 A | 9/2000 | Welch et al. |
| 6,128,602 A | 10/2000 | Northington et al. |
| 6,128,624 A | 10/2000 | Papierniak et al. |
| 6,144,957 A | 11/2000 | Cohen et al. |
| 6,151,601 A | 11/2000 | Papierniak et al. |
| 6,157,707 A | 12/2000 | Baulier et al. |
| 6,157,927 A | 12/2000 | Schaefer et al. |
| 6,161,139 A | 12/2000 | Win et al. |
| 6,173,284 B1 | 1/2001 | Brown |
| 6,178,442 B1 | 1/2001 | Yamazaki |
| 6,199,077 B1 | 3/2001 | Inala et al. |
| 6,202,053 B1 | 3/2001 | Christiansen et al. |
| 6,223,171 B1 | 4/2001 | Chaudhuri et al. |
| 6,233,588 B1 | 5/2001 | Marchoili et al. |
| 6,253,202 B1 | 6/2001 | Gilmour |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,275,824 B1 | 8/2001 | O'Flaherty et al. |
| 6,304,869 B1 | 10/2001 | Moore et al. |
| 6,311,169 B2 | 10/2001 | Duhon |
| 6,317,783 B1 | 11/2001 | Freishtat et al. |
| 6,339,769 B1 | 1/2002 | Cochrane et al. |
| 6,366,903 B1 | 4/2002 | Agrawal et al. |
| 6,397,197 B1 | 5/2002 | Gindlesperger |
| 6,405,173 B1 | 6/2002 | Honarvar |
| 6,405,245 B1 | 6/2002 | Burson et al. |
| 6,446,200 B1 | 9/2002 | Ball et al. |
| 6,448,980 B1 | 9/2002 | Kumar et al. |
| 6,453,353 B1 | 9/2002 | Win et al. |
| 6,457,012 B1 | 9/2002 | Jatkowski |
| 6,463,533 B1 | 10/2002 | Calamera et al. |
| 6,477,565 B1 | 11/2002 | Daswani et al. |
| 6,496,819 B1 | 12/2002 | Bello et al. |
| 6,496,931 B1 | 12/2002 | Rajchel et al. |
| 6,505,168 B1 | 1/2003 | Rothman et al. |
| 6,517,587 B2 | 2/2003 | Satyavolu et al. |
| 6,523,021 B1 | 2/2003 | Monberg et al. |
| 6,523,022 B1 | 2/2003 | Hobbs |
| 6,523,041 B1 | 2/2003 | Morgan et al. |
| 6,543,683 B2 | 4/2003 | Hoffman |
| 6,564,210 B1 | 5/2003 | Korda et al. |
| 6,567,850 B1 | 5/2003 | Freishtat et al. |
| 6,574,623 B1 | 6/2003 | Laung et al. |
| 6,574,736 B1 | 6/2003 | Andrews |
| 6,581,059 B1 | 6/2003 | Barrett et al. |
| 6,601,173 B1 | 7/2003 | Mohler |
| 6,601,234 B1 | 7/2003 | Bowman-Amuah |
| 6,618,727 B1 | 9/2003 | Wheeler et al. |
| 6,633,910 B1 | 10/2003 | Rajan et al. |
| 6,647,383 B1 | 11/2003 | August et al. |
| 6,651,220 B1 | 11/2003 | Penteroudakis et al. |
| 6,658,393 B1 | 12/2003 | Basch et al. |
| 6,665,677 B1 | 12/2003 | Wotring et al. |
| 6,691,136 B2 | 2/2004 | Lee et al. |
| 6,708,166 B1 | 3/2004 | Dysart et al. |
| 6,714,944 B1 | 3/2004 | Shapiro et al. |
| 6,725,381 B1 | 4/2004 | Smith et al. |
| 6,725,425 B1 | 4/2004 | Rajan et al. |
| 6,738,748 B2 | 5/2004 | Wetzer |
| 6,738,759 B1 | 5/2004 | Wheeler et al. |
| 6,742,001 B2 | 5/2004 | Ripley |
| 6,748,426 B1 | 6/2004 | Shaffer et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,782,379 B2 | 8/2004 | Lee |
| 6,802,042 B2 | 10/2004 | Rangan et al. |
| 6,804,346 B1 | 10/2004 | Mewhinney |
| 6,804,701 B2 | 10/2004 | Muret et al. |
| 6,816,871 B2 | 11/2004 | Lee |
| 6,839,714 B2 | 1/2005 | Wheeler et al. |
| 6,842,782 B1 | 1/2005 | Malik et al. |
| 6,845,448 B1 | 1/2005 | Chaganti et al. |
| 6,850,895 B2 | 2/2005 | Brodersen et al. |
| 6,853,997 B2 | 2/2005 | Wotring et al. |
| 6,865,680 B1 | 3/2005 | Wu et al. |
| 6,871,220 B1 | 3/2005 | Rajan et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,947,984 B2 | 9/2005 | Schweitzer et al. |
| 6,947,989 B2 | 9/2005 | Gullotta et al. |
| 6,950,858 B2 | 9/2005 | Ogami |
| 6,954,757 B2 | 10/2005 | Zargham et al. |
| 6,976,056 B1 | 12/2005 | Kumar |
| 6,983,379 B1 | 1/2006 | Spalink et al. |
| 6,983,478 B1 | 1/2006 | Grauch et al. |

(56) References Cited

U.S. PATENT DOCUMENTS

| | | |
|---|---|---|
| 6,985,887 B1 | 1/2006 | Sunstein et al. |
| 6,985,898 B1 | 1/2006 | Ripley et al. |
| 6,999,941 B1 | 2/2006 | Agarwal |
| 7,003,504 B1 | 2/2006 | Angus et al. |
| 7,013,310 B2 | 3/2006 | Messing et al. |
| 7,016,907 B2 | 3/2006 | Boreham et al. |
| 7,028,001 B1 | 4/2006 | Muthuswamy et al. |
| 7,028,052 B2 | 4/2006 | Chapman et al. |
| 7,035,855 B1 | 4/2006 | Kilger et al. |
| 7,039,176 B2 | 5/2006 | Borodow et al. |
| 7,039,656 B1 | 5/2006 | Tsai et al. |
| 7,043,476 B2 | 5/2006 | Robson |
| 7,047,251 B2 | 5/2006 | Reed et al. |
| 7,050,982 B2 | 5/2006 | Sheinson et al. |
| 7,050,989 B1 | 5/2006 | Hurt et al. |
| 7,062,475 B1 | 6/2006 | Szabo et al. |
| 7,069,240 B2 | 6/2006 | Spero et al. |
| 7,075,894 B2 | 7/2006 | Hein et al. |
| 7,076,475 B2 | 7/2006 | Honarvar et al. |
| 7,082,435 B1 | 7/2006 | Guzman et al. |
| 7,085,997 B1 | 8/2006 | Wu et al. |
| 7,092,898 B1 | 8/2006 | Mattick et al. |
| 7,117,172 B1 | 10/2006 | Black |
| 7,124,144 B2 | 10/2006 | Christianson et al. |
| 7,133,935 B2 | 11/2006 | Hedy |
| 7,155,739 B2 | 12/2006 | Bari et al. |
| 7,167,907 B2 | 1/2007 | Shaffer et al. |
| 7,178,096 B2 | 2/2007 | Rangan et al. |
| 7,184,974 B2 | 2/2007 | Shishido |
| 7,185,016 B1 | 2/2007 | Rasmussen |
| 7,188,107 B2 | 3/2007 | Moon et al. |
| 7,188,252 B1 | 3/2007 | Dunn |
| 7,200,602 B2 | 4/2007 | Jonas |
| 7,219,107 B2 | 5/2007 | Beringer |
| 7,221,377 B1 | 5/2007 | Okita et al. |
| 7,222,369 B2 | 5/2007 | Vering et al. |
| 7,234,160 B2 | 6/2007 | Vogel et al. |
| 7,240,059 B2 | 7/2007 | Bayliss et al. |
| 7,243,369 B2 | 7/2007 | Bhat et al. |
| 7,246,067 B2 | 7/2007 | Austin et al. |
| 7,249,048 B1 | 7/2007 | O'Flaherty |
| 7,249,072 B1 | 7/2007 | Nearhood et al. |
| 7,263,548 B2 | 8/2007 | Daswani et al. |
| 7,272,591 B1 | 9/2007 | Ghazal et al. |
| 7,277,900 B1 | 10/2007 | Ganesh et al. |
| 7,283,998 B2 | 10/2007 | Moon et al. |
| 7,315,837 B2 | 1/2008 | Sloan et al. |
| 7,328,233 B2 | 2/2008 | Salim et al. |
| 7,340,679 B2 | 3/2008 | Botscheck et al. |
| 7,346,703 B2 | 3/2008 | Cope |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,373,335 B2 | 5/2008 | Cleghorn et al. |
| 7,376,603 B1 | 5/2008 | Mayr et al. |
| 7,379,880 B1 | 5/2008 | Pathria et al. |
| 7,383,215 B1 | 6/2008 | Navarro et al. |
| 7,383,988 B2 | 6/2008 | Slonecker, Jr. |
| 7,386,554 B2 | 6/2008 | Ripley et al. |
| 7,389,305 B1 | 6/2008 | Kindig et al. |
| 7,395,273 B2 | 7/2008 | Khan et al. |
| 7,403,942 B1 | 7/2008 | Bayliss |
| 7,421,322 B1 | 9/2008 | Silversmith et al. |
| 7,421,442 B1 | 9/2008 | Gelb et al. |
| 7,424,439 B1 | 9/2008 | Fayyad et al. |
| 7,424,520 B2 | 9/2008 | Daswani et al. |
| 7,433,864 B2 | 10/2008 | Malik |
| 7,451,113 B1 | 11/2008 | Kasower |
| 7,460,857 B2 | 12/2008 | Roach, Jr. |
| 7,467,127 B1 | 12/2008 | Baccash et al. |
| 7,467,401 B2 | 12/2008 | Cicchitto |
| 7,475,118 B2 | 1/2009 | Leiba et al. |
| 7,478,157 B2 | 1/2009 | Bohrer et al. |
| 7,483,842 B1 | 1/2009 | Fung et al. |
| 7,490,356 B2 | 2/2009 | Lieblich et al. |
| 7,505,938 B2 | 3/2009 | Lang et al. |
| 7,529,698 B2 | 5/2009 | Joao |
| 7,533,179 B2 | 5/2009 | Tarquini et al. |
| 7,536,346 B2 | 5/2009 | Aliffi et al. |
| 7,543,739 B2 | 6/2009 | Brown et al. |
| 7,546,266 B2 | 6/2009 | Beirne et al. |
| 7,546,271 B2 | 6/2009 | Chmielewski et al. |
| 7,552,089 B2 | 6/2009 | Bruer et al. |
| 7,552,190 B1 | 6/2009 | Freishtat et al. |
| 7,556,192 B2 | 7/2009 | Wokaty, Jr. |
| 7,559,217 B2 | 7/2009 | Bass |
| 7,562,093 B2 | 7/2009 | Gelb et al. |
| 7,562,184 B2 | 7/2009 | Henmi et al. |
| 7,562,814 B1 | 7/2009 | Shao et al. |
| 7,571,473 B1 | 8/2009 | Boydstun et al. |
| 7,577,934 B2 | 8/2009 | Anonsen et al. |
| 7,580,884 B2 | 8/2009 | Cook |
| 7,584,126 B1 | 9/2009 | White |
| 7,584,146 B1 | 9/2009 | Duhon |
| 7,584,197 B2 | 9/2009 | Dant |
| 7,587,366 B2 | 9/2009 | Grim, III et al. |
| 7,593,889 B2 | 9/2009 | Raines et al. |
| 7,596,512 B1 | 9/2009 | Raines et al. |
| 7,596,716 B2 | 9/2009 | Frost et al. |
| 7,603,701 B2 | 10/2009 | Gaucas |
| 7,606,725 B2 | 10/2009 | Robertson et al. |
| 7,613,600 B2 | 11/2009 | Krane |
| 7,613,671 B2 | 11/2009 | Serrano-Morales et al. |
| 7,634,737 B2 | 12/2009 | Beringer et al. |
| 7,640,200 B2 | 12/2009 | Gardner et al. |
| 7,647,344 B2 | 1/2010 | Skurtovich, Jr. et al. |
| 7,653,592 B1 | 1/2010 | Flaxman et al. |
| 7,653,688 B2 | 1/2010 | Bittner |
| 7,657,540 B1 | 2/2010 | Bayliss |
| 7,668,840 B2 | 2/2010 | Bayliss et al. |
| 7,672,833 B2 | 3/2010 | Blume et al. |
| 7,672,879 B1 | 3/2010 | Kumar et al. |
| 7,672,924 B1 | 3/2010 | Scheurich et al. |
| 7,672,926 B2 | 3/2010 | Ghazal et al. |
| 7,676,751 B2 | 3/2010 | Allen et al. |
| 7,685,209 B1 | 3/2010 | Norton et al. |
| 7,689,505 B2 | 3/2010 | Kasower |
| 7,689,506 B2 | 3/2010 | Fei et al. |
| 7,689,526 B2 | 3/2010 | Byrnes et al. |
| 7,698,163 B2 | 4/2010 | Reed et al. |
| 7,698,445 B2 | 4/2010 | Fitzpatrick et al. |
| 7,707,059 B2 | 4/2010 | Reed et al. |
| 7,707,164 B2 | 4/2010 | Kapochunas et al. |
| 7,707,271 B2 | 4/2010 | Rudkin et al. |
| 7,711,635 B2 | 5/2010 | Steele et al. |
| 7,720,846 B1 | 5/2010 | Bayliss |
| 7,730,078 B2 | 6/2010 | Schwabe et al. |
| 7,739,139 B2 | 6/2010 | Robertson et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,752,236 B2 | 7/2010 | Williams et al. |
| 7,752,535 B2 | 7/2010 | Satyavolu |
| 7,756,789 B2 | 7/2010 | Welker et al. |
| 7,765,166 B2 | 7/2010 | Beringer et al. |
| 7,765,279 B1 | 7/2010 | Kaib et al. |
| 7,765,311 B2 | 7/2010 | Itabashi et al. |
| 7,769,696 B2 | 8/2010 | Yoda |
| 7,769,998 B2 | 8/2010 | Lynch et al. |
| 7,774,270 B1 | 8/2010 | MacCloskey |
| 7,783,515 B1 | 8/2010 | Kumar et al. |
| 7,788,040 B2 | 8/2010 | Haskell et al. |
| 7,797,252 B2 | 9/2010 | Rosskamm et al. |
| 7,797,725 B2 | 9/2010 | Lunt et al. |
| 7,801,812 B2 | 9/2010 | Conlin et al. |
| 7,801,956 B1 | 9/2010 | Cumberbatch et al. |
| 7,810,036 B2 | 10/2010 | Bales et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,818,231 B2 | 10/2010 | Rajan |
| 7,830,382 B2 | 11/2010 | Cirit et al. |
| 7,832,006 B2 | 11/2010 | Chen et al. |
| 7,836,111 B1 | 11/2010 | Shan |

(56) References Cited

U.S. PATENT DOCUMENTS

| | | | |
|---|---|---|---|
| 7,841,008 | B1 | 11/2010 | Cole et al. |
| 7,844,604 | B2 | 11/2010 | Baio et al. |
| 7,853,518 | B2 | 12/2010 | Cagan |
| 7,870,151 | B2 | 1/2011 | Mayer et al. |
| 7,873,677 | B2 | 1/2011 | Messing et al. |
| 7,877,304 | B1 | 1/2011 | Coulter |
| 7,895,139 | B2 | 2/2011 | Sullivan et al. |
| 7,908,242 | B1 | 3/2011 | Achanta |
| 7,912,842 | B1 | 3/2011 | Bayliss et al. |
| 7,912,865 | B2 | 3/2011 | Akerman et al. |
| 7,930,242 | B2 | 4/2011 | Morris et al. |
| 7,958,126 | B2 | 6/2011 | Schachter |
| 7,975,299 | B1 | 7/2011 | Balducci et al. |
| 7,983,932 | B2 | 7/2011 | Kane |
| 7,991,688 | B2 | 8/2011 | Phelan et al. |
| 7,991,901 | B2 | 8/2011 | Tarquini et al. |
| 7,996,912 | B2 | 8/2011 | Spalink et al. |
| 8,001,153 | B2 | 8/2011 | Skurtovich, Jr. et al. |
| 8,001,235 | B2 | 8/2011 | Russ et al. |
| 8,005,759 | B2 | 8/2011 | Hirtenstein et al. |
| 8,015,614 | B2 | 9/2011 | Matsuzaki et al. |
| 8,019,843 | B2 | 9/2011 | Cash et al. |
| 8,024,264 | B2 | 9/2011 | Chaudhuri et al. |
| 8,024,778 | B2 | 9/2011 | Cash et al. |
| 8,060,423 | B1 | 11/2011 | Rukonic et al. |
| 8,060,424 | B2 | 11/2011 | Kasower |
| 8,060,502 | B2 | 11/2011 | Churi et al. |
| 8,060,541 | B2 | 11/2011 | Dant |
| 8,064,586 | B2 | 11/2011 | Shaffer et al. |
| 8,065,233 | B2 | 11/2011 | Lee et al. |
| 8,065,264 | B1 | 11/2011 | Achanta |
| 8,095,458 | B2 | 1/2012 | Peterson et al. |
| 8,099,341 | B2 | 1/2012 | Varghese |
| 8,104,679 | B2 | 1/2012 | Brown |
| 8,127,986 | B1 | 3/2012 | Taylor et al. |
| 8,131,777 | B2 | 3/2012 | McCullouch |
| 8,160,960 | B1 | 4/2012 | Fei et al. |
| 8,161,104 | B2 | 4/2012 | Tomkow |
| 8,170,998 | B2 | 5/2012 | Churi et al. |
| 8,175,889 | B1 | 5/2012 | Girulat et al. |
| 8,180,654 | B2 | 5/2012 | Berkman et al. |
| 8,190,629 | B2 | 5/2012 | Wu et al. |
| 8,190,998 | B2 | 5/2012 | Bitterlich |
| 8,201,257 | B1 | 6/2012 | Andres et al. |
| 8,214,238 | B1 | 7/2012 | Fairfield et al. |
| 8,219,535 | B1 | 7/2012 | Kobori et al. |
| 8,219,771 | B2 | 7/2012 | Le Neel |
| 8,224,723 | B2 | 7/2012 | Bosch et al. |
| 8,234,498 | B2 | 7/2012 | Britti et al. |
| 8,239,130 | B1 | 8/2012 | Upstill et al. |
| 8,244,635 | B2 | 8/2012 | Freishtat et al. |
| 8,255,978 | B2 | 8/2012 | Dick |
| 8,266,065 | B2 | 9/2012 | Dilip et al. |
| 8,266,168 | B2 | 9/2012 | Bayliss |
| 8,266,515 | B2 | 9/2012 | Satyavolu |
| 8,271,378 | B2 | 9/2012 | Chaudhuri et al. |
| 8,280,805 | B1 | 10/2012 | Abrahams et al. |
| 8,285,656 | B1 | 10/2012 | Chang et al. |
| 8,296,229 | B1 | 10/2012 | Yellin et al. |
| 8,306,986 | B2 | 11/2012 | Routson et al. |
| 8,312,033 | B1 | 11/2012 | McMillan |
| 8,321,339 | B2 | 11/2012 | Imrey et al. |
| 8,321,952 | B2 | 11/2012 | Spalink et al. |
| 8,326,672 | B2 | 12/2012 | Haggerty et al. |
| 8,326,725 | B2 | 12/2012 | Elwell et al. |
| 8,340,685 | B2 | 12/2012 | Cochran et al. |
| 8,345,790 | B2 | 1/2013 | Sartori et al. |
| 8,359,210 | B1 | 1/2013 | Altinger et al. |
| 8,364,518 | B1 | 1/2013 | Blake et al. |
| 8,370,371 | B1 | 2/2013 | Moncla et al. |
| 8,380,590 | B1 | 2/2013 | Rukonic et al. |
| 8,386,377 | B1 | 2/2013 | Xiong et al. |
| 8,392,334 | B2 | 3/2013 | Hirtenstein et al. |
| 8,433,512 | B1 | 4/2013 | Lopatenko et al. |
| 8,458,074 | B2 | 6/2013 | Showalter |
| 8,463,919 | B2 | 6/2013 | Tarquini et al. |
| 8,464,046 | B1 | 6/2013 | Kragh |
| 8,468,198 | B2 | 6/2013 | Tomkow |
| 8,473,354 | B2 | 6/2013 | Psota et al. |
| 8,478,674 | B1 | 7/2013 | Kapczynski et al. |
| 8,484,211 | B2 | 7/2013 | Bayliss |
| 8,495,077 | B2 | 7/2013 | Bayliss |
| 8,495,384 | B1 | 7/2013 | DeLuccia |
| 8,498,930 | B2 | 7/2013 | Chung et al. |
| 8,504,456 | B2 | 8/2013 | Griffin et al. |
| 8,504,470 | B1 | 8/2013 | Chirehdast |
| 8,510,184 | B2 | 8/2013 | Imrev et al. |
| 8,510,189 | B2 | 8/2013 | Imrey et al. |
| 8,515,828 | B1 | 8/2013 | Wolf et al. |
| 8,515,862 | B2 | 8/2013 | Zhang et al. |
| 8,521,628 | B1 | 8/2013 | Gowen et al. |
| 8,521,729 | B2 | 8/2013 | Churi et al. |
| 8,538,980 | B1 | 9/2013 | MacKenzie |
| 8,549,472 | B1 | 10/2013 | Tilwani |
| 8,560,434 | B2 | 10/2013 | Morris et al. |
| 8,560,436 | B2 | 10/2013 | Ingram et al. |
| 8,566,029 | B1 | 10/2013 | Lopatenko et al. |
| 8,566,141 | B1 | 10/2013 | Nagdev et al. |
| 8,572,083 | B1 | 10/2013 | Snell et al. |
| 8,583,593 | B1 | 11/2013 | Achanta |
| 8,589,069 | B1 | 11/2013 | Lehman |
| 8,589,208 | B2 | 11/2013 | Kruger et al. |
| 8,600,854 | B2 | 12/2013 | Mayr et al. |
| 8,606,666 | B1 | 12/2013 | Courbage et al. |
| 8,620,579 | B1 | 12/2013 | Upstill et al. |
| 8,626,618 | B2 | 1/2014 | Psota et al. |
| 8,631,242 | B2 | 1/2014 | Britti et al. |
| 8,639,616 | B1 | 1/2014 | Rolenaitis et al. |
| 8,639,920 | B2 | 1/2014 | Stack et al. |
| 8,650,407 | B2 | 2/2014 | Britti et al. |
| 8,660,943 | B1 | 2/2014 | Chirehdast |
| 8,671,115 | B2 | 3/2014 | Skurtovich, Jr. et al. |
| 8,677,129 | B2 | 3/2014 | Milana et al. |
| 8,694,390 | B2 | 4/2014 | Imrey et al. |
| 8,694,502 | B2 | 4/2014 | Bayliss |
| 8,705,718 | B2 | 4/2014 | Baniak et al. |
| 8,706,474 | B2 | 4/2014 | Blume et al. |
| 8,725,613 | B1 | 5/2014 | Celka et al. |
| 8,732,004 | B1 | 5/2014 | Ramos et al. |
| 8,738,515 | B2 | 5/2014 | Chaudhuri et al. |
| 8,738,516 | B1 | 5/2014 | Dean et al. |
| 8,762,053 | B1 | 6/2014 | Lehman |
| 8,768,826 | B2 | 7/2014 | Imrey et al. |
| 8,768,914 | B2 | 7/2014 | Scriffignano et al. |
| 8,775,299 | B2 | 7/2014 | Achanta et al. |
| 8,781,877 | B2 | 7/2014 | Kruger et al. |
| 8,781,882 | B1 | 7/2014 | Arboletti et al. |
| 8,781,953 | B2 | 7/2014 | Kasower |
| 8,782,217 | B1 | 7/2014 | Arone et al. |
| 8,788,701 | B1 | 7/2014 | Byrnes et al. |
| 8,805,805 | B1 | 8/2014 | Kobori et al. |
| 8,818,888 | B1 | 8/2014 | Kapczynski et al. |
| 8,825,544 | B2 | 9/2014 | Imrey et al. |
| 8,862,566 | B2 | 10/2014 | Leitner et al. |
| 8,903,741 | B2 | 12/2014 | Imrey et al. |
| 8,938,432 | B2 | 1/2015 | Rossmark et al. |
| 8,949,981 | B1 | 2/2015 | Trollope et al. |
| 8,954,459 | B1 | 2/2015 | McMillan et al. |
| 8,965,934 | B2 | 2/2015 | Prieditis |
| 8,966,649 | B2 | 2/2015 | Stack et al. |
| 8,972,400 | B1 | 3/2015 | Kapczynski et al. |
| 9,057,616 | B1 | 6/2015 | Lopatenko et al. |
| 9,057,617 | B1 | 6/2015 | Lopatenko et al. |
| 9,075,848 | B2 | 7/2015 | Churi et al. |
| 9,116,918 | B1 | 8/2015 | Kim |
| 9,143,541 | B1 | 9/2015 | Szamonek et al. |
| 9,147,042 | B1 | 9/2015 | Haller et al. |
| 9,152,727 | B1 | 10/2015 | Balducci et al. |
| 9,165,044 | B2 | 10/2015 | Psenka et al. |
| 9,256,624 | B2 | 2/2016 | Skurtovich, Jr. et al. |
| 9,268,803 | B2 | 2/2016 | Kapochunas et al. |
| 9,305,300 | B2 | 4/2016 | Mulhern et al. |
| 9,324,087 | B2 | 4/2016 | Routson et al. |
| 9,342,783 | B1 | 5/2016 | Chang et al. |

(56) References Cited

U.S. PATENT DOCUMENTS

| | | | |
|---|---|---|---|
| 9,438,570 B2 | 9/2016 | Milana et al. |
| 9,449,346 B1 | 9/2016 | Hockey et al. |
| 9,529,851 B1 | 12/2016 | Smith |
| 9,535,959 B2 | 1/2017 | Sun et al. |
| 9,553,936 B2 | 1/2017 | Dijk et al. |
| 9,595,023 B1 | 3/2017 | Hockey et al. |
| 9,595,051 B2 | 3/2017 | Stack et al. |
| 9,636,053 B2 | 5/2017 | Peterson et al. |
| 9,646,058 B2 | 5/2017 | Churi et al. |
| 9,684,905 B1 | 6/2017 | Haller et al. |
| 9,705,863 B2 | 7/2017 | Britti et al. |
| 9,710,523 B2 | 7/2017 | Skurtovich, Jr. et al. |
| 9,710,852 B1 | 7/2017 | Olson et al. |
| 9,774,681 B2 | 9/2017 | Zoldi et al. |
| 9,866,561 B2 | 1/2018 | Psenka et al. |
| 9,955,003 B2 | 4/2018 | Cody et al. |
| 9,989,501 B2 | 6/2018 | Tat et al. |
| 10,003,591 B2 | 6/2018 | Hockey et al. |
| 10,075,446 B2 | 9/2018 | McMillan et al. |
| 10,102,536 B1 | 10/2018 | Hickman et al. |
| 10,104,059 B2 | 10/2018 | Hockey et al. |
| 10,108,818 B2 | 10/2018 | Curcio et al. |
| 10,115,102 B2 | 10/2018 | Burrell et al. |
| 10,117,609 B2 | 11/2018 | Peterson et al. |
| 10,180,861 B2 | 1/2019 | Raghavan et al. |
| 10,262,362 B1 | 4/2019 | Hu et al. |
| 10,282,790 B1* | 5/2019 | Kolbrener ............ G06Q 40/025 |
| 10,319,029 B1 | 6/2019 | Hockey et al. |
| 10,339,330 B2 | 7/2019 | Riley et al. |
| 10,367,888 B2 | 7/2019 | Zoldi et al. |
| 10,380,654 B2 | 8/2019 | Hirtenstein et al. |
| 10,437,895 B2 | 10/2019 | Chang et al. |
| 10,503,798 B2 | 12/2019 | Chen et al. |
| 10,515,084 B2 | 12/2019 | Sun et al. |
| 10,523,653 B2 | 12/2019 | Hockey et al. |
| 10,530,761 B2 | 1/2020 | Hockey et al. |
| 10,547,739 B2 | 1/2020 | Cody et al. |
| 10,580,025 B2 | 3/2020 | Hickman et al. |
| 10,580,724 B2 | 3/2020 | Britti et al. |
| 10,614,463 B1 | 4/2020 | Hockey et al. |
| 10,691,825 B2 | 6/2020 | Jones et al. |
| 10,693,840 B2 | 6/2020 | Peterson et al. |
| 10,726,491 B1 | 7/2020 | Hockey et al. |
| 10,810,218 B2 | 10/2020 | Ng et al. |
| 10,885,139 B2 | 1/2021 | Chen et al. |
| 10,887,457 B1 | 1/2021 | Degeorgis et al. |
| 10,963,434 B1 | 3/2021 | Rodriguez et al. |
| 10,979,560 B2 | 4/2021 | Cody et al. |
| 11,042,662 B2 | 6/2021 | Riley et al. |
| 11,107,158 B1 | 8/2021 | Hu et al. |
| 11,157,872 B2 | 10/2021 | McMillan et al. |
| 11,163,943 B2 | 11/2021 | Billman et al. |
| 11,227,001 B2 | 1/2022 | Rege et al. |
| 11,263,218 B2 | 3/2022 | Pieniazek et al. |
| 11,270,275 B2 | 3/2022 | Anderson et al. |
| 11,308,170 B2 | 4/2022 | Chang et al. |
| 11,328,083 B2 | 5/2022 | Jones et al. |
| 11,443,316 B2 | 9/2022 | Burrell et al. |
| 11,461,383 B2 | 10/2022 | Xie et al. |
| 11,468,186 B2 | 10/2022 | Dong et al. |
| 2001/0000536 A1 | 4/2001 | Tarin |
| 2001/0014878 A1 | 8/2001 | Mitra et al. |
| 2001/0029470 A1 | 10/2001 | Schultz et al. |
| 2001/0029482 A1 | 10/2001 | Tealdi et al. |
| 2001/0034631 A1 | 10/2001 | Kiselik |
| 2001/0037332 A1 | 11/2001 | Miller et al. |
| 2001/0039532 A1 | 11/2001 | Coleman, Jr. et al. |
| 2001/0049274 A1 | 12/2001 | Degraeve |
| 2001/0049620 A1 | 12/2001 | Blasko |
| 2002/0004736 A1 | 1/2002 | Roundtree et al. |
| 2002/0010664 A1 | 1/2002 | Rabideau et al. |
| 2002/0010701 A1 | 1/2002 | Kosciuszko |
| 2002/0013827 A1 | 1/2002 | Edstrom et al. |
| 2002/0026507 A1 | 2/2002 | Sears et al. |
| 2002/0026519 A1 | 2/2002 | Itabashi et al. |
| 2002/0033846 A1 | 3/2002 | Balasubramanian et al. |
| 2002/0049701 A1 | 4/2002 | Nabe et al. |
| 2002/0049738 A1 | 4/2002 | Epstein |
| 2002/0052884 A1 | 5/2002 | Farber et al. |
| 2002/0069122 A1 | 6/2002 | Yun et al. |
| 2002/0077964 A1 | 6/2002 | Brody et al. |
| 2002/0091650 A1 | 7/2002 | Ellis |
| 2002/0091706 A1 | 7/2002 | Anderson et al. |
| 2002/0099628 A1 | 7/2002 | Takaoka et al. |
| 2002/0099824 A1 | 7/2002 | Bender et al. |
| 2002/0099936 A1 | 7/2002 | Kou et al. |
| 2002/0103809 A1 | 8/2002 | Starzl et al. |
| 2002/0103933 A1 | 8/2002 | Garon et al. |
| 2002/0111816 A1 | 8/2002 | Lortscher et al. |
| 2002/0111910 A1 | 8/2002 | Walsh |
| 2002/0120757 A1 | 8/2002 | Sutherland et al. |
| 2002/0128962 A1 | 9/2002 | Kasower |
| 2002/0131565 A1 | 9/2002 | Scheuring et al. |
| 2002/0133504 A1 | 9/2002 | Vlahos et al. |
| 2002/0138297 A1 | 9/2002 | Lee |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0156676 A1 | 10/2002 | Ahrens et al. |
| 2002/0161496 A1 | 10/2002 | Yamaki |
| 2002/0161664 A1 | 10/2002 | Shaya et al. |
| 2002/0165757 A1 | 11/2002 | Lisser |
| 2002/0173984 A1 | 11/2002 | Robertson et al. |
| 2002/0184255 A1 | 12/2002 | Edd et al. |
| 2002/0188544 A1 | 12/2002 | Wizon et al. |
| 2002/0198800 A1 | 12/2002 | Shamrakov |
| 2002/0198824 A1 | 12/2002 | Cook |
| 2003/0002671 A1 | 1/2003 | Inchalik et al. |
| 2003/0009418 A1 | 1/2003 | Green et al. |
| 2003/0018578 A1 | 1/2003 | Schultz |
| 2003/0023531 A1 | 1/2003 | Fergusson |
| 2003/0041050 A1 | 2/2003 | Smith et al. |
| 2003/0046311 A1 | 3/2003 | Baidya et al. |
| 2003/0050882 A1 | 3/2003 | Degen et al. |
| 2003/0055931 A1 | 3/2003 | Cravo De Almeida et al. |
| 2003/0069839 A1 | 4/2003 | Whittington et al. |
| 2003/0069943 A1 | 4/2003 | Bahrs et al. |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105728 A1 | 6/2003 | Yano et al. |
| 2003/0105733 A1 | 6/2003 | Boreham |
| 2003/0105742 A1 | 6/2003 | Boreham et al. |
| 2003/0135451 A1 | 7/2003 | O'Brien et al. |
| 2003/0153299 A1 | 8/2003 | Perfit et al. |
| 2003/0158749 A1 | 8/2003 | Olchanski et al. |
| 2003/0158776 A1 | 8/2003 | Landesmann |
| 2003/0163513 A1 | 8/2003 | Schaeck et al. |
| 2003/0171942 A1 | 9/2003 | Gaito |
| 2003/0191731 A1 | 10/2003 | Stewart et al. |
| 2003/0200151 A1 | 10/2003 | Ellenson et al. |
| 2003/0204429 A1 | 10/2003 | Botscheck et al. |
| 2003/0208412 A1 | 11/2003 | Hillestad et al. |
| 2003/0212654 A1 | 11/2003 | Harper et al. |
| 2003/0229892 A1 | 12/2003 | Sardera |
| 2004/0006488 A1 | 1/2004 | Fitall et al. |
| 2004/0010458 A1 | 1/2004 | Friedman |
| 2004/0019799 A1 | 1/2004 | Vering et al. |
| 2004/0030649 A1 | 2/2004 | Nelson et al. |
| 2004/0044673 A1 | 3/2004 | Brady et al. |
| 2004/0052357 A1 | 3/2004 | Logan et al. |
| 2004/0083215 A1 | 4/2004 | de Jong |
| 2004/0083482 A1 | 4/2004 | Makagon et al. |
| 2004/0088237 A1 | 5/2004 | Moenickheim et al. |
| 2004/0088255 A1 | 5/2004 | Zielke et al. |
| 2004/0098625 A1 | 5/2004 | Lagadec et al. |
| 2004/0103147 A1 | 5/2004 | Flesher et al. |
| 2004/0107250 A1 | 6/2004 | Marciano |
| 2004/0111359 A1 | 6/2004 | Hudock |
| 2004/0117358 A1 | 6/2004 | Von Kaenel et al. |
| 2004/0122696 A1 | 6/2004 | Beringer |
| 2004/0128150 A1 | 7/2004 | Lundegren |
| 2004/0128156 A1 | 7/2004 | Beringer et al. |

(56) References Cited

U.S. PATENT DOCUMENTS

| | | |
|---|---|---|
| 2004/0128227 A1 | 7/2004 | Whipple et al. |
| 2004/0128230 A1 | 7/2004 | Oppenheimer et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0139025 A1 | 7/2004 | Coleman |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153330 A1 | 8/2004 | Miller et al. |
| 2004/0153448 A1 | 8/2004 | Cheng et al. |
| 2004/0153521 A1 | 8/2004 | Kogo |
| 2004/0176995 A1 | 9/2004 | Fusz |
| 2004/0193538 A1 | 9/2004 | Raines |
| 2004/0199456 A1 | 10/2004 | Flint et al. |
| 2004/0199789 A1 | 10/2004 | Shaw et al. |
| 2004/0204948 A1 | 10/2004 | Singletary et al. |
| 2004/0220865 A1 | 11/2004 | Lozowski et al. |
| 2004/0220896 A1 | 11/2004 | Finlay et al. |
| 2004/0220918 A1 | 11/2004 | Scriffignano et al. |
| 2004/0221043 A1 | 11/2004 | Su et al. |
| 2004/0225099 A1 | 11/2004 | Hohberg et al. |
| 2004/0225594 A1 | 11/2004 | Nolan, III et al. |
| 2004/0225596 A1 | 11/2004 | Kemper et al. |
| 2004/0225643 A1 | 11/2004 | Alpha et al. |
| 2004/0230534 A1 | 11/2004 | McGough |
| 2004/0243588 A1 | 12/2004 | Tanner et al. |
| 2004/0254935 A1 | 12/2004 | Chagoly et al. |
| 2004/0267714 A1 | 12/2004 | Frid et al. |
| 2005/0005168 A1 | 1/2005 | Dick |
| 2005/0010513 A1 | 1/2005 | Duckworth et al. |
| 2005/0010555 A1 | 1/2005 | Gallivan |
| 2005/0027995 A1 | 2/2005 | Menschik et al. |
| 2005/0038737 A1 | 2/2005 | Norris |
| 2005/0049991 A1 | 3/2005 | Aggarwal |
| 2005/0055231 A1 | 3/2005 | Lee |
| 2005/0060332 A1 | 3/2005 | Bernstein et al. |
| 2005/0071328 A1 | 3/2005 | Lawrence |
| 2005/0086261 A1 | 4/2005 | Mammone |
| 2005/0091164 A1 | 4/2005 | Varble |
| 2005/0097039 A1 | 5/2005 | Kulcsar et al. |
| 2005/0102180 A1 | 5/2005 | Gailey et al. |
| 2005/0108396 A1 | 5/2005 | Bittner |
| 2005/0108631 A1 | 5/2005 | Amorin et al. |
| 2005/0113991 A1 | 5/2005 | Rogers et al. |
| 2005/0114335 A1 | 5/2005 | Wesinger et al. |
| 2005/0114344 A1 | 5/2005 | Wesinger et al. |
| 2005/0114345 A1 | 5/2005 | Wesinger et al. |
| 2005/0137899 A1 | 6/2005 | Davies et al. |
| 2005/0154664 A1 | 7/2005 | Guy et al. |
| 2005/0154769 A1 | 7/2005 | Eckart et al. |
| 2005/0187948 A1 | 8/2005 | Monitzer et al. |
| 2005/0192008 A1 | 9/2005 | Desai et al. |
| 2005/0193093 A1 | 9/2005 | Mathew et al. |
| 2005/0197953 A1 | 9/2005 | Broadbent et al. |
| 2005/0208461 A1 | 9/2005 | Krebs et al. |
| 2005/0226224 A1 | 10/2005 | Lee et al. |
| 2005/0246338 A1 | 11/2005 | Bird |
| 2005/0257250 A1 | 11/2005 | Mitchell et al. |
| 2005/0262158 A1 | 11/2005 | Sauermann |
| 2005/0273849 A1 | 12/2005 | Araujo et al. |
| 2005/0288998 A1 | 12/2005 | Verma et al. |
| 2005/0289003 A1 | 12/2005 | Thompson et al. |
| 2006/0015425 A1 | 1/2006 | Brooks |
| 2006/0020611 A1 | 1/2006 | Gilbert et al. |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041670 A1 | 2/2006 | Musseleck et al. |
| 2006/0069635 A1 | 3/2006 | Ram et al. |
| 2006/0074991 A1 | 4/2006 | Lussier et al. |
| 2006/0079211 A1 | 4/2006 | Degraeve |
| 2006/0080233 A1 | 4/2006 | Mendelovich et al. |
| 2006/0080251 A1 | 4/2006 | Fried et al. |
| 2006/0085361 A1 | 4/2006 | Hoerle et al. |
| 2006/0085454 A1 | 4/2006 | Blegen et al. |
| 2006/0129419 A1 | 6/2006 | Flaxer et al. |
| 2006/0136330 A1 | 6/2006 | DeRoy et al. |
| 2006/0136595 A1 | 6/2006 | Satyavolu |
| 2006/0149674 A1 | 7/2006 | Cook et al. |
| 2006/0155573 A1 | 7/2006 | Hartunian |
| 2006/0155780 A1 | 7/2006 | Sakairi et al. |
| 2006/0161554 A1 | 7/2006 | Lucovsky et al. |
| 2006/0179050 A1 | 8/2006 | Giang et al. |
| 2006/0184440 A1 | 8/2006 | Britti et al. |
| 2006/0184585 A1 | 8/2006 | Grear et al. |
| 2006/0195688 A1 | 8/2006 | Drissi et al. |
| 2006/0235935 A1 | 10/2006 | Ng |
| 2006/0241923 A1 | 10/2006 | Xu et al. |
| 2006/0242047 A1 | 10/2006 | Haggerty et al. |
| 2006/0267999 A1 | 11/2006 | Cash et al. |
| 2006/0276171 A1 | 12/2006 | Pousti |
| 2006/0277089 A1 | 12/2006 | Hubbard et al. |
| 2006/0277092 A1 | 12/2006 | Williams |
| 2006/0277141 A1 | 12/2006 | Palmer |
| 2006/0282359 A1 | 12/2006 | Nobili et al. |
| 2006/0282429 A1 | 12/2006 | Hernandez-Sherrington et al. |
| 2006/0282819 A1 | 12/2006 | Graham et al. |
| 2006/0288090 A1 | 12/2006 | Kraft |
| 2006/0293932 A1 | 12/2006 | Cash et al. |
| 2006/0294199 A1 | 12/2006 | Bertholf |
| 2007/0011020 A1 | 1/2007 | Martin |
| 2007/0011030 A1 | 1/2007 | Bregante et al. |
| 2007/0011032 A1 | 1/2007 | Bregante et al. |
| 2007/0011083 A1 | 1/2007 | Bird et al. |
| 2007/0016517 A1 | 1/2007 | Solomon |
| 2007/0022141 A1 | 1/2007 | Singleton et al. |
| 2007/0027778 A1 | 2/2007 | Schellhammer et al. |
| 2007/0030282 A1 | 2/2007 | Cash et al. |
| 2007/0038483 A1 | 2/2007 | Wood |
| 2007/0038497 A1 | 2/2007 | Britti et al. |
| 2007/0047714 A1 | 3/2007 | Baniak et al. |
| 2007/0067285 A1 | 3/2007 | Blume et al. |
| 2007/0067437 A1 | 3/2007 | Sindambiwe |
| 2007/0094230 A1 | 4/2007 | Subramaniam et al. |
| 2007/0094241 A1 | 4/2007 | M. Blackwell et al. |
| 2007/0094264 A1 | 4/2007 | Nair |
| 2007/0112668 A1 | 5/2007 | Celano et al. |
| 2007/0118393 A1 | 5/2007 | Rosen et al. |
| 2007/0130070 A1 | 6/2007 | Williams |
| 2007/0156554 A1 | 7/2007 | Nikoley et al. |
| 2007/0156589 A1 | 7/2007 | Zimler et al. |
| 2007/0185797 A1 | 8/2007 | Robinson |
| 2007/0204338 A1 | 8/2007 | Aiello et al. |
| 2007/0208640 A1 | 9/2007 | Banasiak et al. |
| 2007/0214000 A1 | 9/2007 | Shahrabi et al. |
| 2007/0220611 A1 | 9/2007 | Socolow et al. |
| 2007/0226010 A1 | 9/2007 | Larsen |
| 2007/0226093 A1 | 9/2007 | Chan et al. |
| 2007/0226129 A1 | 9/2007 | Liao et al. |
| 2007/0244782 A1 | 10/2007 | Chimento |
| 2007/0250441 A1 | 10/2007 | Paulsen et al. |
| 2007/0250459 A1 | 10/2007 | Schwarz et al. |
| 2007/0261114 A1 | 11/2007 | Pomerantsev |
| 2007/0282730 A1 | 12/2007 | Carpenter et al. |
| 2007/0282736 A1 | 12/2007 | Conlin et al. |
| 2007/0288360 A1 | 12/2007 | Seeklus |
| 2007/0299759 A1 | 12/2007 | Kelly |
| 2008/0010206 A1 | 1/2008 | Coleman |
| 2008/0021804 A1 | 1/2008 | Deckoff |
| 2008/0027858 A1 | 1/2008 | Benson |
| 2008/0033742 A1 | 2/2008 | Bernasconi |
| 2008/0033750 A1 | 2/2008 | Burriss et al. |
| 2008/0033956 A1 | 2/2008 | Saha et al. |
| 2008/0052244 A1 | 2/2008 | Tsuei et al. |
| 2008/0059224 A1 | 3/2008 | Schechter |
| 2008/0059317 A1 | 3/2008 | Chandran et al. |
| 2008/0059449 A1 | 3/2008 | Webster et al. |
| 2008/0072316 A1 | 3/2008 | Chang et al. |
| 2008/0082536 A1 | 4/2008 | Schwabe et al. |
| 2008/0109875 A1 | 5/2008 | Kraft |
| 2008/0115191 A1 | 5/2008 | Kim et al. |
| 2008/0120569 A1 | 5/2008 | Mann et al. |
| 2008/0177655 A1 | 7/2008 | Zalik |

(56) References Cited

U.S. PATENT DOCUMENTS

| | | |
|---|---|---|
| 2008/0183504 A1 | 7/2008 | Highley |
| 2008/0183564 A1 | 7/2008 | Tien et al. |
| 2008/0184270 A1 | 7/2008 | Cole et al. |
| 2008/0195600 A1 | 8/2008 | Deakter |
| 2008/0201401 A1 | 8/2008 | Pugh et al. |
| 2008/0205655 A1 | 8/2008 | Wilkins et al. |
| 2008/0205774 A1 | 8/2008 | Brinker et al. |
| 2008/0208610 A1 | 8/2008 | Thomas et al. |
| 2008/0208631 A1 | 8/2008 | Morita et al. |
| 2008/0208735 A1 | 8/2008 | Balet et al. |
| 2008/0208873 A1 | 8/2008 | Boehmer |
| 2008/0216156 A1 | 9/2008 | Kosaka |
| 2008/0244008 A1 | 10/2008 | Wilkinson et al. |
| 2008/0249869 A1 | 10/2008 | Angell et al. |
| 2008/0263058 A1 | 10/2008 | Peden |
| 2008/0270209 A1 | 10/2008 | Mauseth et al. |
| 2008/0270294 A1 | 10/2008 | Lent et al. |
| 2008/0288283 A1 | 11/2008 | Baldwin, Jr. et al. |
| 2008/0294540 A1 | 11/2008 | Celka et al. |
| 2008/0301016 A1 | 12/2008 | Durvasula et al. |
| 2008/0301188 A1 | 12/2008 | O'Hara |
| 2008/0306750 A1 | 12/2008 | Wunder et al. |
| 2008/0312969 A1 | 12/2008 | Raines et al. |
| 2008/0319889 A1 | 12/2008 | Hammad |
| 2008/0320575 A1 | 12/2008 | Gelb et al. |
| 2009/0006475 A1 | 1/2009 | Udezue et al. |
| 2009/0018986 A1 | 1/2009 | Alcorn et al. |
| 2009/0018996 A1 | 1/2009 | Hunt et al. |
| 2009/0024428 A1 | 1/2009 | Hudock, Jr. |
| 2009/0024505 A1 | 1/2009 | Patel et al. |
| 2009/0031426 A1 | 1/2009 | Dal Lago et al. |
| 2009/0043691 A1 | 2/2009 | Kasower |
| 2009/0048877 A1 | 2/2009 | Binns et al. |
| 2009/0048957 A1 | 2/2009 | Celano |
| 2009/0055894 A1 | 2/2009 | Lorsch |
| 2009/0060343 A1 | 3/2009 | Rosea |
| 2009/0094064 A1 | 4/2009 | Tyler et al. |
| 2009/0094237 A1 | 4/2009 | Churi et al. |
| 2009/0094674 A1 | 4/2009 | Schwartz et al. |
| 2009/0106846 A1 | 4/2009 | Dupray et al. |
| 2009/0112650 A1 | 4/2009 | Iwane |
| 2009/0113532 A1 | 4/2009 | Lapidous |
| 2009/0119169 A1 | 5/2009 | Chandratillake et al. |
| 2009/0132347 A1 | 5/2009 | Anderson et al. |
| 2009/0138335 A1 | 5/2009 | Lieberman |
| 2009/0144102 A1 | 6/2009 | Lopez |
| 2009/0150166 A1 | 6/2009 | Leite et al. |
| 2009/0150238 A1 | 6/2009 | Marsh et al. |
| 2009/0164232 A1 | 6/2009 | Chmielewski et al. |
| 2009/0164380 A1 | 6/2009 | Brown |
| 2009/0182661 A1 | 7/2009 | Irwin |
| 2009/0183259 A1 | 7/2009 | Rinek et al. |
| 2009/0210807 A1 | 8/2009 | Xiao et al. |
| 2009/0216591 A1 | 8/2009 | Buerger et al. |
| 2009/0216640 A1 | 8/2009 | Masi |
| 2009/0222449 A1 | 9/2009 | Hom et al. |
| 2009/0228918 A1 | 9/2009 | Rolff et al. |
| 2009/0234665 A1 | 9/2009 | Conkel |
| 2009/0234876 A1 | 9/2009 | Schigel et al. |
| 2009/0240609 A1 | 9/2009 | Cho et al. |
| 2009/0249440 A1 | 10/2009 | Platt et al. |
| 2009/0254375 A1 | 10/2009 | Martinez et al. |
| 2009/0254656 A1 | 10/2009 | Vignisson et al. |
| 2009/0254971 A1 | 10/2009 | Herz et al. |
| 2009/0271265 A1 | 10/2009 | Lay et al. |
| 2009/0313049 A1 | 12/2009 | Joao et al. |
| 2009/0313562 A1 | 12/2009 | Appleyard et al. |
| 2009/0327120 A1 | 12/2009 | Eze et al. |
| 2009/0328173 A1 | 12/2009 | Jakobson et al. |
| 2010/0010935 A1 | 1/2010 | Shelton |
| 2010/0011428 A1 | 1/2010 | Atwood et al. |
| 2010/0023434 A1 | 1/2010 | Bond |
| 2010/0030578 A1 | 2/2010 | Siddique et al. |
| 2010/0030677 A1 | 2/2010 | Melik-Aslanian et al. |
| 2010/0037299 A1 | 2/2010 | Karasick et al. |
| 2010/0042583 A1 | 2/2010 | Gervais |
| 2010/0049803 A1 | 2/2010 | Ogilvie et al. |
| 2010/0094704 A1 | 4/2010 | Subramanian et al. |
| 2010/0094758 A1 | 4/2010 | Chamberlain et al. |
| 2010/0114724 A1 | 5/2010 | Ghosh et al. |
| 2010/0145836 A1 | 6/2010 | Baker et al. |
| 2010/0153707 A1 | 6/2010 | Lentz, II |
| 2010/0169159 A1 | 7/2010 | Rose et al. |
| 2010/0169264 A1 | 7/2010 | O'Sullivan |
| 2010/0185546 A1 | 7/2010 | Pollard |
| 2010/0188684 A1 | 7/2010 | Kumara |
| 2010/0205076 A1 | 8/2010 | Parson et al. |
| 2010/0211445 A1 | 8/2010 | Bodington |
| 2010/0211636 A1 | 8/2010 | Starkenburg et al. |
| 2010/0217837 A1 | 8/2010 | Ansari et al. |
| 2010/0248681 A1 | 9/2010 | Phills |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0268660 A1 | 10/2010 | Ekdahl |
| 2010/0293090 A1 | 11/2010 | Domenikos et al. |
| 2011/0009707 A1 | 1/2011 | Kaundinya et al. |
| 2011/0016042 A1 | 1/2011 | Cho et al. |
| 2011/0023115 A1 | 1/2011 | Wright |
| 2011/0054981 A1 | 3/2011 | Faith et al. |
| 2011/0078073 A1 | 3/2011 | Annappindi et al. |
| 2011/0113084 A1 | 5/2011 | Ramnani |
| 2011/0113086 A1 | 5/2011 | Long et al. |
| 2011/0125595 A1 | 5/2011 | Neal et al. |
| 2011/0126275 A1 | 5/2011 | Anderson et al. |
| 2011/0131131 A1 | 6/2011 | Griffin et al. |
| 2011/0137760 A1 | 6/2011 | Rudie et al. |
| 2011/0137789 A1 | 6/2011 | Kortina et al. |
| 2011/0142213 A1 | 6/2011 | Baniak et al. |
| 2011/0161218 A1 | 6/2011 | Swift |
| 2011/0164746 A1 | 7/2011 | Nice et al. |
| 2011/0166988 A1 | 7/2011 | Coulter |
| 2011/0178899 A1 | 7/2011 | Huszar |
| 2011/0178922 A1 | 7/2011 | Imrey et al. |
| 2011/0179139 A1 | 7/2011 | Starkenburg et al. |
| 2011/0184838 A1 | 7/2011 | Winters et al. |
| 2011/0196791 A1 | 8/2011 | Dominguez |
| 2011/0202474 A1 | 8/2011 | Mele et al. |
| 2011/0211445 A1 | 9/2011 | Chen |
| 2011/0219421 A1 | 9/2011 | Ullman et al. |
| 2011/0238566 A1 | 9/2011 | Santos |
| 2011/0258050 A1 | 10/2011 | Chan et al. |
| 2011/0264566 A1 | 10/2011 | Brown |
| 2012/0011056 A1 | 1/2012 | Ward et al. |
| 2012/0029956 A1 | 2/2012 | Ghosh et al. |
| 2012/0030216 A1 | 2/2012 | Churi et al. |
| 2012/0030771 A1 | 2/2012 | Pierson et al. |
| 2012/0054592 A1 | 3/2012 | Jaffe et al. |
| 2012/0066065 A1 | 3/2012 | Switzer |
| 2012/0072464 A1 | 3/2012 | Cohen |
| 2012/0101939 A1 | 4/2012 | Kasower |
| 2012/0106801 A1 | 5/2012 | Jackson |
| 2012/0109990 A1 | 5/2012 | Yamasaki |
| 2012/0110467 A1 | 5/2012 | Blake et al. |
| 2012/0117509 A1* | 5/2012 | Powell ............ G06F 16/24575 707/E17.045 |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0158460 A1 | 6/2012 | Kruger et al. |
| 2012/0158654 A1 | 6/2012 | Behren et al. |
| 2012/0173339 A1 | 7/2012 | Flynt et al. |
| 2012/0179536 A1 | 7/2012 | Kalb et al. |
| 2012/0198556 A1 | 8/2012 | Patel et al. |
| 2012/0215682 A1 | 8/2012 | Lent et al. |
| 2012/0216125 A1 | 8/2012 | Pierce |
| 2012/0226916 A1 | 9/2012 | Hahn et al. |
| 2012/0232958 A1 | 9/2012 | Silbert |
| 2012/0265607 A1 | 10/2012 | Belwadi |
| 2012/0278227 A1 | 11/2012 | Kolo et al. |
| 2012/0284118 A1 | 11/2012 | Mamich, Jr. et al. |
| 2012/0290660 A1 | 11/2012 | Rao et al. |

(56) References Cited

U.S. PATENT DOCUMENTS

| | | |
|---|---|---|
| 2013/0031109 A1 | 1/2013 | Roulson et al. |
| 2013/0031113 A1* | 1/2013 | Feng ................. G06F 16/243 |
| | | 707/E17.014 |
| 2013/0124263 A1 | 5/2013 | Amaro et al. |
| 2013/0125010 A1 | 5/2013 | Strandell |
| 2013/0132151 A1 | 5/2013 | Stibel et al. |
| 2013/0159168 A1 | 6/2013 | Evans |
| 2013/0173447 A1 | 7/2013 | Rothschild |
| 2013/0185293 A1 | 7/2013 | Boback |
| 2013/0226783 A1 | 8/2013 | Haggerty et al. |
| 2013/0268357 A1 | 10/2013 | Heath |
| 2013/0279676 A1 | 10/2013 | Baniak et al. |
| 2013/0293363 A1 | 11/2013 | Plymouth |
| 2013/0332338 A1 | 12/2013 | Yan et al. |
| 2013/0332467 A1 | 12/2013 | Bornea et al. |
| 2014/0025562 A1 | 1/2014 | Rothrock et al. |
| 2014/0032265 A1 | 1/2014 | Paprocki et al. |
| 2014/0032300 A1 | 1/2014 | Zhang et al. |
| 2014/0040182 A1 | 2/2014 | Gilder et al. |
| 2014/0074689 A1 | 3/2014 | Lund et al. |
| 2014/0136422 A1 | 5/2014 | Jung et al. |
| 2014/0164112 A1 | 6/2014 | Kala |
| 2014/0164519 A1 | 6/2014 | Shah |
| 2014/0172687 A1 | 6/2014 | Chirehdast |
| 2014/0244353 A1 | 8/2014 | Winters |
| 2014/0279329 A1 | 9/2014 | Dancel |
| 2014/0304263 A1* | 10/2014 | Vaitheeswaran ...... G06F 16/285 |
| | | 707/737 |
| 2014/0316969 A1 | 10/2014 | Imrey |
| 2014/0324655 A1 | 10/2014 | Kolathur |
| 2015/0066772 A1 | 3/2015 | Griffin et al. |
| 2015/0254329 A1 | 9/2015 | Agarwal et al. |
| 2015/0278277 A1 | 10/2015 | Agrawal et al. |
| 2015/0287091 A1 | 10/2015 | Koran |
| 2016/0004728 A1 | 1/2016 | Balet et al. |
| 2016/0048700 A1 | 2/2016 | Stransky-Heilkron |
| 2016/0227037 A1 | 8/2016 | Roybal et al. |
| 2016/0342999 A1 | 11/2016 | Rouston et al. |
| 2017/0098096 A1 | 4/2017 | Redberg |
| 2017/0177809 A1 | 6/2017 | Bull et al. |
| 2017/0249481 A1 | 8/2017 | Edison |
| 2017/0262821 A1 | 9/2017 | Imrey et al. |
| 2018/0075527 A1 | 3/2018 | Nagla et al. |
| 2018/0089379 A1 | 3/2018 | Collins et al. |
| 2018/0150599 A1 | 5/2018 | Valdes et al. |
| 2018/0218069 A1 | 8/2018 | Rege et al. |
| 2018/0253702 A1 | 9/2018 | Dowding |
| 2018/0276222 A1* | 9/2018 | Belknap ................. G06Q 10/10 |
| 2018/0330516 A1* | 11/2018 | Baca ................... G06K 9/6267 |
| 2018/0343265 A1 | 11/2018 | McMillan et al. |
| 2019/0065516 A1 | 2/2019 | Barker |
| 2019/0188717 A1 | 6/2019 | Putnam et al. |
| 2019/0318122 A1 | 10/2019 | Hockey et al. |
| 2019/0356672 A1 | 11/2019 | Bondugula et al. |
| 2020/0074109 A1 | 3/2020 | Pieniazek et al. |
| 2020/0106764 A1 | 4/2020 | Hockey et al. |
| 2020/0106765 A1 | 4/2020 | Hockey et al. |
| 2020/0201878 A1 | 6/2020 | Putnam et al. |
| 2020/0210492 A1 | 7/2020 | Chang et al. |
| 2020/0213206 A1 | 7/2020 | Bracken et al. |
| 2020/0265155 A1 | 8/2020 | Dong et al. |
| 2020/0279053 A1 | 9/2020 | Jones et al. |
| 2020/0327150 A1 | 10/2020 | Kunjur et al. |
| 2020/0327560 A1 | 10/2020 | Anderson et al. |
| 2020/0364246 A1 | 11/2020 | Farrell |
| 2020/0387634 A1 | 12/2020 | Jones et al. |
| 2020/0394675 A1 | 12/2020 | Bradford |
| 2021/0004373 A1 | 1/2021 | Sankaran et al. |
| 2021/0034613 A1 | 2/2021 | Ng et al. |
| 2021/0042366 A1 | 2/2021 | Hicklin et al. |
| 2021/0064725 A1 | 3/2021 | Miller et al. |
| 2021/0158299 A1 | 5/2021 | Baggett |
| 2021/0158368 A1 | 5/2021 | Baggett |
| 2021/0357707 A1 | 11/2021 | Bondugula et al. |
| 2021/0400120 A1 | 12/2021 | Prieditis |
| 2022/0019733 A1 | 1/2022 | Billman et al. |
| 2022/0027853 A1 | 1/2022 | McMillan et al. |
| 2022/0070294 A1 | 3/2022 | Cody et al. |
| 2022/0138238 A1 | 5/2022 | Rege et al. |
| 2022/0156394 A1 | 5/2022 | Riley et al. |
| 2022/0222368 A1 | 7/2022 | Min et al. |
| 2022/0391435 A1 | 12/2022 | Xie et al. |

FOREIGN PATENT DOCUMENTS

| | | |
|---|---|---|
| AU | 2022204452 | 7/2022 |
| CA | 2 868 933 | 10/2013 |
| CA | 2 792 070 | 10/2021 |
| CN | 106255985 | 12/2016 |
| CN | 112036952 | 12/2020 |
| EP | 0 419 889 | 4/1991 |
| EP | 0 458 698 | 11/1991 |
| EP | 0 559 358 | 9/1993 |
| EP | 0 977 128 | 2/2000 |
| EP | 0 772 836 B1 | 12/2001 |
| EP | 1 850 278 | 10/2007 |
| EP | 3 201 804 | 4/2020 |
| EP | 3 846 104 | 7/2021 |
| ES | 2 752 058 | 4/2020 |
| GB | 1 322 809 | 7/1973 |
| IN | 349972 | 4/2016 |
| JP | 10-222559 | 8/1998 |
| JP | 10-261009 | 9/1998 |
| JP | 10-293732 | 11/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2004-0078798 | 9/2004 |
| RU | 2 181 216 | 4/2002 |
| TW | I256569 | 6/2006 |
| WO | WO 95/034155 | 12/1995 |
| WO | WO 96/000945 | 1/1996 |
| WO | WO 98/041931 | 9/1998 |
| WO | WO 98/041932 | 9/1998 |
| WO | WO 98/041933 | 9/1998 |
| WO | WO 98/049643 | 11/1998 |
| WO | WO 99/017225 | 4/1999 |
| WO | WO 99/017226 | 4/1999 |
| WO | WO 99/038094 | 7/1999 |
| WO | WO 00/004465 | 1/2000 |
| WO | WO 00/028441 | 5/2000 |
| WO | WO 00/055778 | 9/2000 |
| WO | WO 00/065469 | 11/2000 |
| WO | WO 01/009752 | 2/2001 |
| WO | WO 01/009792 | 2/2001 |
| WO | WO 01/010090 | 2/2001 |
| WO | WO 01/084281 | 11/2001 |
| WO | WO 2004/031986 | 4/2004 |
| WO | WO 2004/084098 | 9/2004 |
| WO | WO 2004/088464 | 10/2004 |
| WO | WO 2004/114160 | 12/2004 |
| WO | WO 2005/059781 | 6/2005 |
| WO | WO 2006/050278 | 5/2006 |
| WO | WO 2008/022289 | 2/2008 |
| WO | WO 2008/042614 | 4/2008 |
| WO | WO 2008/054403 | 5/2008 |
| WO | WO 2008/127288 | 10/2008 |
| WO | WO 2009/076555 | 6/2009 |
| WO | WO 2009/117518 | 9/2009 |
| WO | WO 2010/132492 | 11/2010 |
| WO | WO 2013/009920 | 1/2013 |
| WO | WO 2014/018900 | 1/2014 |
| WO | WO 2014/066816 | 5/2014 |

(56) References Cited

FOREIGN PATENT DOCUMENTS

| | | |
|---|---|---|
| WO | WO 2015/057538 | 4/2015 |
| WO | WO 2018/144612 | 8/2018 |
| WO | WO 2018/236732 | 12/2018 |
| WO | WO 2019/089439 | 5/2019 |
| WO | WO 2019/136407 | 7/2019 |
| WO | WO 2019/157491 | 8/2019 |
| WO | WO 2019/183483 | 9/2019 |
| WO | WO 2020/198236 | 10/2020 |
| WO | WO 2020/232137 | 11/2020 |
| WO | WO 2021/081516 | 4/2021 |
| WO | WO 2022/109613 | 5/2022 |

OTHER PUBLICATIONS

U.S. Appl. No. 12/705,489, filed Feb. 12, 2010, Bargoli et al.
U.S. Appl. No. 12/705,511, filed Feb. 12, 2010, Bargoli et al.
Actuate, "Delivering Enterprise Information for Corporate Portals", White Paper, 2004, pp. 1-7.
Akl, Selim G., "Digital Signatures: A Tutorial Survey," Computer, Feb. 1983, pp. 15-24.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
Babcock, Gwen, "Aggregation Without Aggravation: Determining Spatial Contiguity and Joining Geographic Areas Using Hashing", SAS Global Forum 2010, Reporting and Information Visualization, Paper 223-2010, pp. 17.
Bitran et al., "Mailing Decisions in Catalog Sales Industry", Management Science (JSTOR), vol. 42, No. 9, pp. 1364-1381, Sep. 1996.
Brick, et al. "Unit and Item Response, Weighting, and Imputation Procedures in the 1993 National Household Education Survey (NHES:93)" U.S. Department of Education. National Center for Education Statistics, Working Paper No. 97-05, Washington, D.C., pp. 30, Feb. 1997.
Burr Ph.D., et al., "Utility Payments as Alternative Credit Data: A Reality Check", Asset Builders of America, Inc., Oct. 5, 2006, pp. 1-18, Washington, D.C.
Buxfer, http://www.buxfer.com/ printed Feb. 5, 2014 in 1 page.
Cáceres, et al., "Measurement and Analysis of IP Network Usage and Behavior", IEEE Communications Magazine, pp. 144-151, May 2000.
Census Geography, Excerpted from the Geographic Reference Manual, Nov. 1994, pp. 5.
Check, http://check.me/ printed Feb. 5, 2014 in 3 pages.
Chiba et al., "Mobility Management Schemes for Heterogeneity Support in Next Generation Wireless Networks", 3rd EuroNGI Conference on, 2007, pp. 143-150.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003, pp. 2.
Corepoint Health, "The Continuity of Care Document—Changing the Landscape of Healthcare Information Exchange," Jan. 2009, pp. 9.
Cohen et al., "Optimizer: IBM's Multi Echelon Inventory System for Managing Service Logistics", Interfaces, vol. 20, No. 1, Jan.-Feb. 1990, pp. 65-82.
"D&B Corporate Family Linkage", D&B Internet Access for U.S. Contract Customers, https://www.dnb.com/ecomp/help/linkage.htm as printed Dec. 17, 2009, pp. 1.
Dankar et al., "Efficient Private Information Retrieval for Geographical Aggregation", Procedia Computer Science, 2014, vol. 37, pp. 497-502.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Davies, Donald W., "Applying the RSA Digital Signature to Electronic Mail," Computer, Feb. 1983, pp. 55-62.
"Debt Settlement: Watch Video on how to Pay Your Debt Faster", http://www.debtconsolidationcare.com/debt-settlement.html printed Jan. 9, 2013 in 6 pages.
Elmasri et al., "Fundamentals of Database Systems, Third Edition (Excerpts)", Jun. 2000, pp. 253, 261, 268-70, 278-80, 585, 595.
Ettorre, "Paul Kahn on Exceptional Marketing," Management Review, vol. 83, No. 11, Nov. 1994, pp. 48-51.
"Experian Helps Verify the Identity of Patients and Provide Secure Enrollment to Healthcare Portals by Integrating with Major Electronic Medical Records Platform," http://press.experian.com/United-States/Press-Release/experian-helps-verify-the-identity-of-patients-and-provide-secure-enrollment-to-healthcare.aspx?&p=1, Dec. 19, 2013, pp. 2.
Experian: Improve Outcomes Through Applied Customer Insight, Brochure, Nov. 2009, pp. 20.
Experian: Mosaic Geodemographic Lifestyle Segmentation on ConsumerView [Data Card], as printed from http://datacards.experian.com/market?page=research/datacard_print&prin, Apr. 6, 2012, pp. 4.
Experian: Mosaic Public Sector 2009 Launch, Jul. 2009, pp. 164.
Experian: Mosaic United Kingdom, Brochure, Jun. 2009, pp. 24.
Experian: Mosaic UK—Optimise the Value of Your Customers and Locations, Now and in the Future, Brochure, Sep. 2010, pp. 24.
Experian: Mosaic UK—Unique Consumer Classification Based on In-Depth Demographic Data, as printed from http://www.experian.co.uk/business-strategies/mosaic-uk.html, Jul. 30, 2012, pp. 2.
Experian: Mosaic USA, Brochure, May 2009, pp. 14.
Experian: Mosaic USA—Consumer Lifestyle Segmentation [Data Card], Dec. 2009, pp. 2.
Experian: Public Sector, as printed form http://publicsector.experian.co.uk/Products/Mosaicpublicsector.aspx, Jul. 2009, pp. 2.
Experian, "Experian Rental Payment Data," http://www.experian.com/rentbureau/rental-data.html printed Nov. 22, 2013 in 2 pages.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directory.westlaw.com/scope/default.asp?db=FBN-ALL&RS-W...&VR=2.0 as printed Dec. 17, 2009, pp. 5.
Fisher, Joseph, "Access to Fair Credit Reports: Current Practices and Proposed Legislation," American Business Law Journal, Fall 1981, vol. 19, No. 3, p. 319.
Garcia-Molina et al., "Database Systems: The Complete Book", Prentice Hall, Inc., Ch. 15, Oct. 1, 2001, pp. 713-715.
"Geographic Aggregation Tool SAS Beta Version 4.1", Environmental Health Surveillance Section, New York State Dept. in Health, Troy, NY, Mar. 24, 2015, pp. 10.
Gionis et al., "Similarity Search in High Dimensions via Hashing", Sep. 7, 1999, pp. 518-529.
"GLBA Compliance and FFIEC Compliance" http://www.trustwave.com/financial-services.php printed Apr. 8, 2013 in 1 page.
Glenn, Brandon, "Multi-provider patient portals get big boost with ONC ruling", Feb. 25, 2013, http://medicaleconomics.modernmedicine.com/medical-economics/news/user-defined-tags/meaningful-use/multi-provider-patient-portals-get-big-boost in 2 pages.
Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.
Hampton et al., "Mapping Health Data: Improved Privacy Protection With Donut Method Geomasking", American Journal of Epidemiology, Septembers, 2010, vol. 172, No. 9, pp. 8.
Handfield et al., "Managing Component Life Cycles in Dynamic Technological Environments", International Journal of Purchasing and Materials Management, Tempe, Spring 1994, vol. 30, No. 2, pp. 20-28.

(56) References Cited

OTHER PUBLICATIONS

Healow.com, Various screenshots from page titled "Health and Online Wellness," https://healow.com/apps/jsp/webview/index.jsp printed Aug. 19, 2013 in 4 pages.

Healthspek.com, "How Good Are We?" http://healthspek.com/how-good-are-we/ printed Jan. 21, 2014 in 2 pages.

"Healthspek Users Can Now Import Their Doctors' Records into Their Personal Health Record," PRWeb, Nashville, TN, Jan. 14, 2014, pp. 1 http://www.prweb.com/releases/2014/01/prweb11485346.htm.

Herron, Janna, "Social Media-Based Credit Score?", http://www.bankrate.com/financing/credit-cards/social-media-based-credit-score/, posted Friday, Jan. 13, 2012, printed Nov. 22, 2013 in 2 pages.

igiHealth.com, "Orbit® PHR: Personal Health Record (PHR)," http://www.igihealth.com/consumers/orbit_phr.html, printed Jan. 21, 2014 in 2 pages.

Inderfurth et al., "Decision Support for Spare Parts Acquisition in Post Product Life Cycle", Central European Journal of Operations Research, 2008, vol. 16, pp. 17-42.

InsightsOne.com, "Healthcare," http://insightsone.com/healthcare-predictive-analytics/ printed Mar. 6, 2014 in 5 pages.

"Japan's JAAI System Appraises Used Cars Over Internet", Asia Pulse, Mar. 3, 2000, p. 1.

Jaro, Matthew A., "Probabilistic Linkage of Large Public Health Data Files", Statistics in Medicine, 1995, vol. 14, pp. 491-498.

Käki, Anssi, "Forecasting in End-Of-Life Spare Parts Procurement", Master's Thesis, Helsinki University of Technology, System Analysis Laboratory, Jul. 27, 2007, pp. 84.

Khare et al., "Nutch: A Flexible and Scalable Open-Source Web Search Engine", CommerceNet Labs Technical Reprt 04-04, Nov. 2004, pp. 15.

Kim et al., "Optimal Pricing, EOL (End of Life) Warranty, and Spare Parts Manufacturing Strategy Amid Product Transition", European Journal of Operation Research, 2008, vol. 188, pp. 723-745.

Krupp, James A.G., "Forecasting for the Automotive Aftermarket", The Journal of Business Forecasting Methods & Systems, Winter 1993-1994, vol. 12, No. 4, ABI/Inform Global, pp. 8-12.

Kwan et al., "Protection of Geoprivacy and Accuracy of Spatial Information: How Effective Are Geographical Masks?" Carographica, Summer 2004, vol. 39, No. 2, pp. 15-27.

Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.

Lapide, Larry, "New Developments in Business Forecasting", The Journal of Business Forecasting, Spring 2002, pp. 12-14.

LendingTree.com, "Lender Ratings & Reviews," http://web.archive.org/web/20091015043716/http://www.lendingtree.com/lender-reviews/, Oct. 15, 2009, in 21 pages.

Li et al., "Automatic Verbal Information Verification for User Authentication", IEEE Transactions on Speech and Audio Processing, vol. 8, No. 5, Sep. 2000, pp. 585-596.

Lobo, Jude, "MySAP.com Enterprise Portal Cookbook," SAP Technical Delivery, Feb. 2002, vol. 1, pp. 1-13.

Lovelace, Robin, "IPFinR: An Implementation of Spatial Microsimulation in R", RL's Powerstar, Jun. 12, 2013, pp. 9, https://robinlovelace.wordpress.com/2013/06/12/ipfinr-an-implementation-of-spatial-microsimulation-in-r/.

Maciejewski et al., "Understanding Syndromic Hotspots—A Visual Analytics Approach", Conference Paper, IEEE Symposium on Visual Analytics Science and Technology, Oct. 21-23, 2017, pp. 35-42.

Manilla, http://www.manilla.com/how-it-works/ printed Feb. 5, 2014 in 1 page.

McNamara, Paul, "Start-up's pitch: The Envelope, please," Network World, Apr. 28, 1997, vol. 14, No. 17, p. 33.

Medick et al., "German Agency to Mine Facebook to Assess Creditworthiness", Jun. 7, 2012, http://www.spiegel.de/international/germany/german-credit-agency-plans-to-analyze-individual-facebook-pages-a-837539.html printed Nov. 22, 2013 in 2 pages.

MERit Credit Engine™, Diagram, https://web.archive.org/web/20020204202530/http://creditengine.net/diagram.htm, copyright 1997, archived Feb. 4, 2002, pp. 1.

Microbilt, "PRBC Credit Reporting Agency—Payment Reporting Builds Credit," retrieved from http://www.microbilt.com/nontraditional-credit-report.aspx and corresponding "Sample Report," retrieved from http://www.microbilt.com/pdfs/PRBC%20Sample%20Report%20(complete).pdf printed Nov. 21, 2013 in 8 pages.

Microfinance Africa, "Philippines: Microfinance Players to get Their Own Credit Info Bureau," Apr. 5, 2011, http://microfinanceafrica.net/microfinance-around-the-world/philippines-microfinance-players-to-get-their-own-credit-info-bureau/ printed Nov. 22, 2013 in 2 pages.

Microsoft, "Expand the Reach of Your Business," Microsoft Business Solutions, 2004, in 16 pages.

Miller, Joe, "NADA Used-Car Prices Go Online", Automotive News, Jun. 14, 1999, p. 36.

Mint.com, http://www.mint.com/how-it-works/ printed Feb. 5, 2013 in 2 pages.

Moore, John R., Jr. "Forecasting and Scheduling for Past-Model Replacement Parts", Management Science, Application Series, vol. 18, No. 4, Part 1, Dec. 1971, pp. B-200-B-213.

"Mosaic" (geodemography), available from http://en.wikipedia.org/wiki/Mosaic_(geodemography), as last modified Jul. 13, 2012. pp. 4.

Mvelopes, http://www.mvelopes.com/ printed Feb. 5, 2014 in 2 pages.

MyReceipts, http://www.myreceipts.com/, printed Oct. 16, 2012 in 1 page.

MyReceipts—How it Works, http://www.myreceipts.com/howItWorks.do, printed Oct. 16, 2012 in 1 page.

"Name Availability Records", Westlaw Database Directory, http://directory.westlaw.com/scope/default.asp?db=NA-ALL&RS=W...&VR=2.0 as printed Dec. 17, 2009, pp. 5.

Nelson et al., "Efficient, Automatic Web Resource Harvesting", Conference: Eighth ACM International Workshop on Web Information and Data Management (WIDM 2006), Arlington, Virginia, USA, Nov. 10, 2006, pp. 8.

"New FICO score extends lenders' reach to credit-underserved millions", Viewpoints: News, Ideas and Solutions from Fair Isaac, Sep./Oct. 2004 as downloaded from http://www.fairisaac.com/NR/exeres/F178D009-B47A-444F-BD11-8B4D7D8B3532,frame . . . in 6 pages.

Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.

Packer, A. H., "Simulation and Adaptive Forecasting an Applied to Inventory Control", Operations Research, Jul. 1965, vol. 15, No. 4, pp. 660-679.

"Parse", Definition from PC Magazine Encyclopedia, http://www/pcmag.com/encyclopedia_term_0,2542,t=parse&i=48862,00.asp as downloaded Mar. 5, 2012.

PersonalCapital.com, http://www.personalcapital.com/how-it-works printed Feb. 5, 2014 in 5 pages.

Peters, Peter-Paul, "A Spare Parts Configurator for the European Service Business" (Graduation Report), Honeywell, Industrial Service Logistic Center, Amsterdam, The Netherlands, Mar. 2000, pp. 80.

Planet Receipt—Home, http://www.planetreceipt.com/home printed Oct. 16, 2012 in 1 page.

Planet Receipt—Solutions & Features, http://www.planetreceipt.com/solutions-features printed Oct. 16, 2012 in 2 pages.

Ponniah, Paulraj, "Data Warehousing Fundamentals: A Comprehensive Guide for IT Professionals", Wiley-Interscience Publication, pp. 257-289, 377-397, Aug. 3, 2001.

Porter, G. Zell, "An Economic Method for Evaluating Electronic Component Obsolescence Solutions", www.gidep.org/data/dmsms/library/zell.pdf, May 1998, pp. 1-9.

"PostX to Present at Internet Showcase", PR Newswire, Apr. 28, 1997, pp. 2.

(56) References Cited

OTHER PUBLICATIONS

PostX, "PostX® Envelope and ActiveView", http://web.archive.org/web/19970714203719/http://www.postx.com/priducts_fm.html, Jul. 14, 1997 (retrieved Nov. 7, 2013) in 2 pages.
"PremierGuide Announces Release 3.0 of Local Search Platform", Business Wire, Mar. 4, 2004, Palo Alto, CA, p. 5574.
"Qualifying For Debt Settlement", http://www.certifieddebt.com/debt/settlement-qualifications.shtml printed Jan. 9, 2013 in 2 pages.
Rahm, et al. "Data Cleaning: Problems and Current Approaches", Bulletin of the IEEE Computer Society Technical Committee on Data Engineering, Dec. 2000, vol. 23, No. 4, pp. 11.
Raman, et al., "Potter's Wheel: An Interactive Data Cleaning System", Proceedings of the 27th VLDB Conference, Roma, Italy, 2001, pp. 10.
"Resolve Debt for Less: With Help from Freedom Financial" http://www.debtsettlementusa.com/ printed Jan. 9, 2013 in 6 pages.
Roos, Gina, "Web-Based Service Helps OEMs Cure Parts Obsolescence Blues", Electronic Engineering Times, Oct. 8, 2001, p. 86.
Santarini, Michael, "Forecasts the Probable Obsolescence of Components—Module Predicts Parts Life", Electronic Engineering Times, Jan. 11, 1999, vol. 1, p. 48.
SAS, "SAS® Information Delivery Portal", Fact Sheet, 2008, in 4 pages.
Sawyers, Arlena, "NADA to Offer Residual Guide", Automotive News, May 22, 2000, p. 1.
Sax, Michael M., Data Collection and Privacy Protection: An International Perspective, Presentation: Managing Online Risk and Liability Conference, Aug. 31, 1999, pp. 58.
Schneier, B. "Applied Cryptography", John Wiley & Sons, Second Edition, pp. 435-447, 1996.
"Settling Your Debts—Part 1 in Our Debt Settlement Series", http://www.creditinfocenter.com/debt/settle_debts.shtml printed Jan. 9, 2013 in 6 pages.
ShoeBoxed, https://www.shoeboxed.com/sbx-home/ printed Oct. 16, 2012 in 4 pages.
Smith, Richard M., "The Web Bug FAQ", Nov. 11, 1999, Version 1.0, pp. 4.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
"STAGG Variables Sum Up Credit Attributes for Automated Decisions", PRWeb, May 11, 2011, pp. 2. http://www.prweb.com/releases/2011/5/prweb8404324.htm.
Stallings, W. "Cryptography and Network Security Principles and Practice", Prentice Hall, Second Edition, pp. 295, 297, Jul. 15, 1998.
Stone, "Linear Expenditure Systems and Demand Analysis: An Application to the Pattern of British Demand", The Economic Journal: The Journal of The Royal Economic Society, Sep. 1954, pp. 511-527, vol. LXIV, Macmillan & Co., London.
Sullivan, Laurie, "Obsolete-Parts Program Thriving", EBN, Manhasset, NY, Jan. 21, 2002, Issue 1296, p. 26.
Tan et al., "Modeling of Web Robot Navigational Patterns", 2000, Department of Computer Science; University of Minnesota, pp. 7.
Tennant, Don, "How a Health Insurance Provider Uses Big Data to Predict Patient Needs," http://www.itbusinessedge.com/blogs/from-under-the-rug/how-a-health-insurance-provider-uses-big-data-to-predict-patient-needs.html, printed Mar. 6, 2014 in 2 pages.
Various Posts from the http://www.2p.wrox.com Forums: http://web.archive.org/web/2005045221950/http://p2p.wrox.com/topic.asp?TOPIC_ID=6513 , dated Nov. 15, 2003-Oct. 7, 2004.
"WashingtonPost.com and Cars.com Launch Comprehensive Automotive Web Site For the Washington Area", PR Newswire, Oct. 22, 1998. pp. 2.
Web Page posted at: http://web.archive.org/web20040805124909/http://www.oracle.com/technology/sample_codete/tech/pl_sql/htdocs/x/Case/start.htm, pp. 1 and 4 of the webpages posted on Jan. 7, 2003.
Web Pages printed Nov. 2, 2004 of Internet Draft entitled "Tunneling SSL Through a WWW Proxy", Luotonen, Ari, Netscape Communications Corporation (Dec. 14, 1995); 4 pages. http://muffin.doit.org/docs/rfc/tunneling.sub.--ssl.html.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Webster, Lee R., "Failure Rates & Life-Cycle Costs", Consulting-Specifying Engineer, Apr. 1998, vol. 23, No. 4, ABI/INFORM Global, p. 42.
Williams, Mark, "Results of the 1998 NASFAA Salary Survey", News from NASFAA, 1998.
Working, Holbrook, "Statistical Laws of Family Expenditure", Journal of the American Statistical Association, pp. 43-56, vol. 38, American Statistical Association, Washington, D.C., Mar. 1943.
Yodlee | Money Center, https://yodleemoneycenter.com/ printed Feb. 5, 2014 in 2 pages.
You Need A Budget, http://www.youneedabudget.com/features printed Feb. 5, 2014 in 3 pages.
Zandbergen, Paul A., "Ensuring Confidentiality of Geocoded Health Data: Assessing Geographic Masking Strategies for Individual-Level Data", Review Article, Hindawi Publishing Corporation, Advances in Medicine, VI. 2014, pp. 14.
Declaration of Paul Clark, DSc. for Inter Partes Review of U.S. Pat. No. 8,504,628 (Symantec Corporation, Petitioner), dated Jan. 15, 2014 in 76 pages.
Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.)) Filed Jan. 14, 2014 in 9 pages.
First Amended Complaint in Civil Action No. 2:12-cv-511-JRG (*Rpost Holdings, Inc. And Rpost Communications Limited* V. *Constant Contact, Inc.; et al.*) filed Feb. 11, 2013 in 14 pages.
First Amended Complaint in Civil Action No. 2:12-cv-511-JRG (*Rpost Holdings, Inc. And Rpost Communications Limited* V. *Epsilon Data Management, LLC.*) filed Sep. 13, 2013 in 9 pages.
First Amended Complaint in Civil Action No. 2:12-cv-513-JRG (*Rpost Holdings, Inc. And Rpost Communications Limited* V. *Experian Marketing Solutions, Inc.*) filed Aug. 30, 2013 in 9 pages.
Petition for Covered Business Method Patent Review in U.S. Pat. No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.
Source Code Appendix attached to U.S. Appl. No. 08/845,722 by Venkatraman et al., Exhibit A, Part 1 & 2, pp. 32.
International Search Report and Written Opinion in PCT Application No. PCT/US07/76152, dated Mar. 20, 2009.
Official Communication in Australian Patent Application No. 2012281182, dated Jul. 8, 2014.
Official Communication in Australian Patent Application No. 2012281182, dated May 19, 2015.
Official Communication in Chinese Patent Application No. 201280041782.2, dated Mar. 4, 2016.
Official Communication in European Patent Application No. 12811546.6, dated Nov. 25, 2014.
Official Communication in European Patent Application No. 12811546.6, dated Sep. 18, 2015.
Official Communication in Indian Patent Application No. 490/DELNP/2014, dated Jun. 20, 2019.
Official Communication in Russian Patent Application No. 2014101674/08, dated Dec. 15, 2014.
International Search Report and Written Opinion for Application No. PCT/US2012/046316, dated Sep. 28, 2012.
International Preliminary Report on Patentability and Written Opinion for Application No. PCT/US2012/046316, dated Jan. 14, 2014.
International Search Report and Written Opinion for Application No. PCT/US09/60393, dated Dec. 23, 2009.
International Search Report and Written Opinion for Application No. PCT/US09/37565, dated May 12, 2009.
International Search Report and Written Opinion for Application No. PCT/US2010/034434, dated Jun. 23, 2010.
International Preliminary Report on Patentability for Application No. PCT/US2010/034434, dated Feb. 4, 2014.

(56) References Cited

OTHER PUBLICATIONS

International Search Report and Written Opinion for Application No. PCT/US2013/052342, dated Nov. 21, 2013.
International Preliminary Reporton Patentability for Application No. PCT/US2013/052342, dated Feb. 5, 2015.
Partial Supplementary European Search Report for Application No. EP12747205, dated May 14, 2020.
Extended European Search Report for Application No. EP12747205, dated Aug. 14, 2020.
International Search Report and Written Opinion for Application No. PCT/US2018/016258, dated May 16, 2018.
International Preliminary Report on Patentability in Application No. PCT/US2018/016258, dated Aug. 15, 2019.
Ideon, Credit-Card Registry that Bellyflopped this Year, Is Drawing some Bottom-Fishers, The Wall Street Journal, Aug. 21, 1995, pp. C2.
"Intelligent Miner Applications Guide", IBM Corp., Apr. 2, 1999, Chapters 4-7, pp. 33-132.
Klein, et al., "A Constant-Utility Index of the Cost of Living", The Review of Economic Studies, Sep. 1, 1947, vol. 15, No. 2, pp. 84-87.
Klein, et al., "An Econometric Model of the United States: 1929-1952", North-Holland Publishing Company, Amsterdam, Jun. 1, 1955, pp. 4-41.
Klein, Lawrence R., "The Keynesian Revolution", New York, The MacMillan Company, Jan. 1, 1947, pp. 56-189.
Loshin, Intelligent Enterprise: Better Insight for Business Decisions, "Value-Added Data: Merge Ahead", Feb. 9, 2000, vol. 3, No. 3, 5 pages.
"ScoreNet® Network", FairIsaac, web.archive.org/web/20071009014242/http://www.fairisaac.com/NR/rdonlyres/AC4C2F79-4160-4E44-B0CB-5C899004879A/0/ScoreNetnetworkBR.pdf, May 2006, pp. 6.
So et al., "Modelling and Model Validation of the Impact of the Economy on the Credit Risk of Credit Card Portfolios", The Journal of Risk Model Validation (93-126), vol. 4, No. 4, Winter (Year: 2010).
Tao, Lixin, "Shifting Paradigms with the Application Service Provider Model"; Concordia University, IEEE, Oct. 2001, Canada.
Official Communication in Australian Patent Application No. 2018215082, dated Jan. 21, 2022.
Extended European Search Report for Application No. EP12747205, dated Feb. 11, 2022.
Official Communication in Indian Patent Application No. 201917029540, dated Jan. 7, 2022.

* cited by examiner

EXAMPLE DATA FLOW – SINGLE/REAL-TIME QUERY FROM EITHER MAINFRAME OR DISTRIBUTED SYSTEM

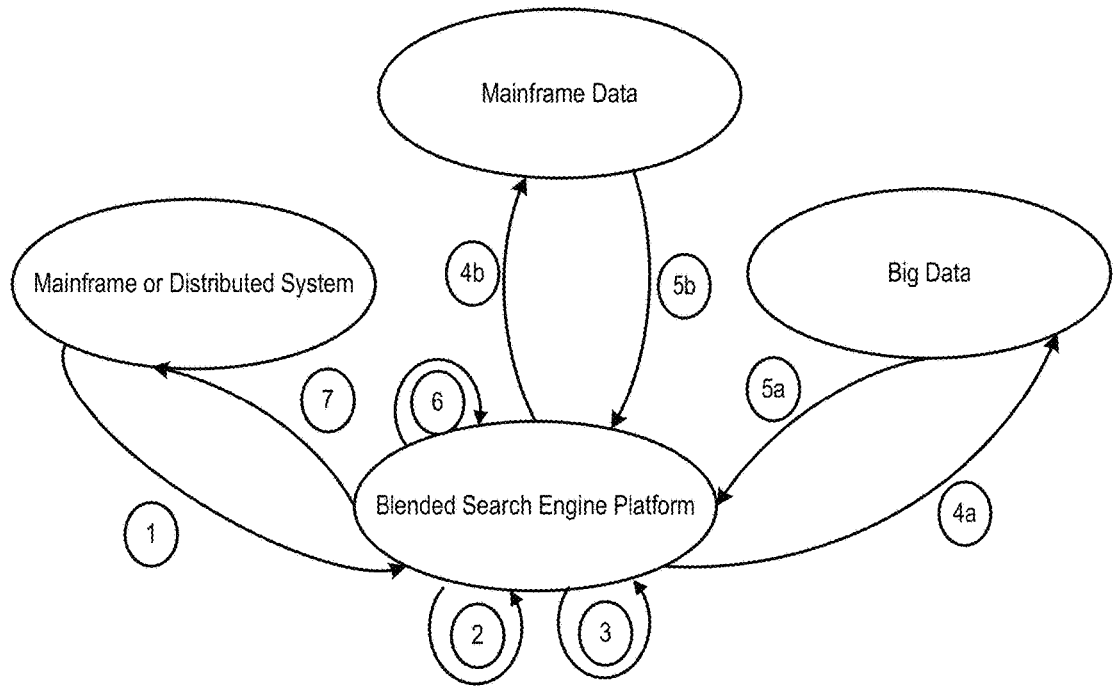

(1) THIRD PARTY TRANSMITS A STRUCTURED OR UNSTRUCTURED QUERY REGARDING A BUSINESS (2) DETERMINE IF QUERY IS STRUCTURED OR UNSTRUCTURED (3) PROCESS QUERY WITH THE APPROPRIATE API FOR STRUCTURED OR UNSTRUCTURED (4a) APPLY SEARCH AND MATCH LOGIC TO EXECUTE QUERY ON BIG DATA (4b) APPLY SEARCH AND MATCH LOGIC TO EXECUTE QUERY ON MAINFRAME DATA (5a) RECEIVE SEARCH RESULTS FROM BIG DATA (5b) RECEIVE SEARCH RESULTS FROM MAINFRAME DATA (6) PROCESS ALL SEARCH RESULTS RECEIVED TO DETERMINE QUERY RESULTS FOR OUTPUT (7) TRANSMIT QUERY RESULTS TO THIRD PARTY

FIG. 2A

EXAMPLE DATA FLOW – BATCH QUERY FROM EITHER MAINFRAME OR DISTRIBUTED SYSTEM

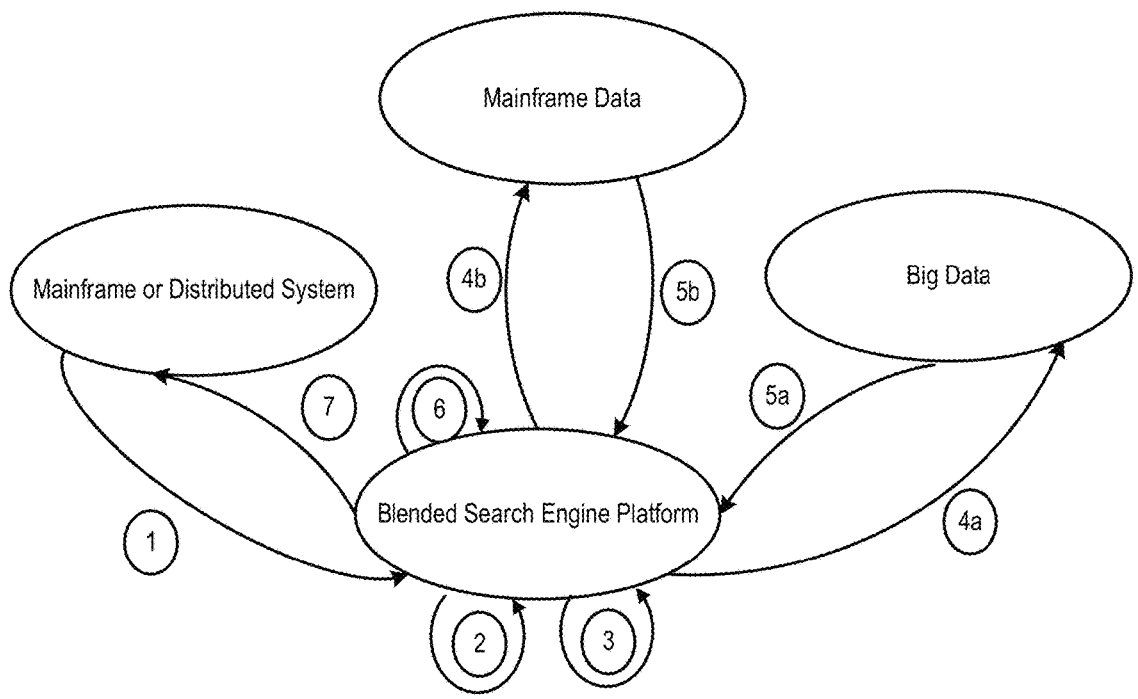

- (1) THIRD PARTY TRANSMITS A BATCH QUERY IN STRUCTURED OR UNSTRUCTURED FORM INCLUDING INQUIRIES REGARDING SEVERAL BUSINESSES
- (2) DETERMINE IF QUERY IS STRUCTURED OR UNSTRUCTURED
- (3) PROCESS QUERY WITH THE APPROPRIATE API FOR STRUCTURED OR UNSTRUCTURED
- (4a) APPLY SEARCH AND MATCH LOGIC TO EXECUTE QUERY ON BIG DATA USING PARTITIONING
- (4b) IF NECESSARY, APPLY SEARCH AND MATCH LOGIC TO EXECUTE QUERY ON MAINFRAME DATA
- (5a) RECEIVE SEARCH RESULTS FROM BIG DATA
- (5b) RECEIVE SEARCH RESULTS FROM MAINFRAME DATA
- (6) PROCESS ALL SEARCH RESULTS RECEIVED TO DETERMINE QUERY RESULTS FOR OUTPUT
- (7) TRANSMIT QUERY RESULTS TO THIRD PARTY

FIG. 2B

EXAMPLE DATA FLOW – FROM MAINFRAME DATA TO BIG DATA

(1) RECEIVE DATA IN FILES FROM MAINFRAME DATABASE *(BOTH MONTHLY AND INCREMENTAL DAILY)*

(2) INCREMENTALLY PROCESS DATA RECEIVED (3) DENORMALIZE DATA AND INCREMENTAL DATA (4) INDEX DATA (5) TRANSMIT INDEXED COPY OF DATA TO SERVING CLUSTER *(THROUGH SCHEDULER)*

DATA ARCHITECTURE FOR SUPPORTING MULTIPLE SEARCH MODELS

RELATED APPLICATION

This application is a continuation of U.S. application Ser. No. 16/124,989, filed Sep. 7, 2018, titled "Data Architecture for Supporting Multiple Search Models;" the content of which is hereby incorporated by reference herein in its entirety for all purposes.

BACKGROUND

The disclosure relates to a data architecture for supporting a blended and unified search platform hosting multiple search models in a plug and play environment.

SUMMARY OF THE DISCLOSURE

Various systems, methods, and devices are disclosed for providing a token gateway environment for providing authorization to parties accessing protected resources. The systems, methods, and devices of the disclosure each have several innovative aspects, no single one of which is solely responsible for the desirable attributes disclosed herein.

In one embodiment, a system is disclosed. The system includes: a relational data scheme storing a first repository of data records associated with a first plurality of entities, wherein each entity is associated with a unique identifier; a non-relational data scheme storing a second repository of data records associated with a second plurality of entities, wherein each entity is associated with a unique identifier, and wherein the second repository includes at least part of the data records associated with the first plurality of entities; and a search and match computing system in electronic communication with a third party computing system, the search and match computing system comprising: a first application programming interface configured to receive structured queries; a second application programming interface configured to receive unstructured queries; a search and match application configured to execute inquiries on the relational data scheme; and a search and match application configured to execute inquiries on the non-relational data scheme; wherein the search and match computing system further comprises instructions, that when executed by the search and match computing system, are configured to: access, from the third party computing system, a query regarding at least one entity; determine if the query is a structured query or an unstructured query; process the query with at least one of the first application programming interface or the second application programming interface; initiate the search and match application for at least one of: the relational data scheme or the non-relational data scheme; receive search results from the at least one of: the relational data scheme or the non-relational data scheme; and process the received search results to generate an output data packet for access by the third party computing system.

In another embodiment, a computer-implemented method for providing entity information is disclosed. The computer-implemented method includes, as implemented by one or more computing devices within a search and match computing system in electronic communication with a third party computing system, the search and match computing system configured with specific executable instructions: receiving, from the third party computing system, a query regarding at least one entity; determining if the query is a structured query or an unstructured query; processing the query with at least one of: an application programming interface configured to receive structured queries or an application programming interface configured to receive unstructured queries; initiating at least one of: a search and match application configured to execute inquiries on a relational data scheme or a search and match application configured to execute inquiries on a non-relational data scheme, wherein the relational data scheme stores a first repository of data records associated with a first plurality of entities, wherein each entity is associated with a unique identifier and the non-relational data scheme stores a second repository of data records associated with a second plurality of entities, wherein each entity is associated with a unique identifier, and wherein the second repository includes at least part of the data records associated with the first plurality of entities; receiving search results from the at least one of: the relational data scheme or the non-relational data scheme; and processing the received search results to generate an output data packet for access by the third party computing system.

In a further embodiment, a non-transitory computer storage medium storing computer-executable instructions is disclosed. The computer-executable instructions, when executed by a processor, can cause the processor to at least: receive, from a third party computing system, a query regarding at least one entity; determine if the query is a structured query or an unstructured query; process the query with at least one of: an application programming interface configured to receive structured queries or an application programming interface configured to receive unstructured queries; initiate at least one of: a search and match application configured to execute inquiries on a relational data scheme or a search and match application configured to execute inquiries on a non-relational data scheme, wherein the relational data scheme stores a first repository of data records associated with a first plurality of entities, wherein each entity is associated with a unique identifier and the non-relational data scheme stores a second repository of data records associated with a second plurality of entities, wherein each entity is associated with a unique identifier, and wherein the second repository includes at least part of the data records associated with the first plurality of entities; receive search results from the at least one of: the relational data scheme or the non-relational data scheme; and process the received search results to generate an output data packet for access by the third party computing system.

BRIEF DESCRIPTION OF DRAWINGS

The foregoing aspects and many of the attendant advantages of this disclosure will become more readily appreciated as the same become better understood by reference to the following detailed description, when taken in conjunction with the accompanying drawings. The accompanying drawings, which are incorporated in, and constitute a part of, this specification, illustrate embodiments of the disclosure.

Throughout the drawings, reference numbers are re-used to indicate correspondence between referenced elements. The drawings are provided to illustrate embodiments of the subject matter described herein and not to limit the scope thereof. Specific embodiments will be described with reference to the following drawings.

FIGS. 2A, 2B and 2C are block diagrams illustrating embodiments of information flow within the data architecture for supporting multiple search models.

DESCRIPTION OF VARIOUS EMBODIMENTS

Embodiments of the disclosure will now be described with reference to the accompanying figures. The terminology used in the description presented herein is not intended to be interpreted in any limited or restrictive manner, simply because it is being utilized in conjunction with a detailed description of embodiments of the disclosure. Furthermore, embodiments of the disclosure may include several novel features, no single one of which is solely responsible for its desirable attributes or which is essential to practicing the embodiments of the disclosure herein described. For purposes of this disclosure, certain aspects, advantages, and novel features of various embodiments are described herein. It is to be understood that not necessarily all such advantages may be achieved in accordance with any particular embodiment. Thus, for example, those skilled in the art will recognize that one embodiment may be carried out in a manner that achieves one advantage or group of advantages as taught herein without necessarily achieving other advantages as may be taught or suggested herein.

I. Overview

Features are described for embodiments of a data architecture for supporting a blended and unified search platform hosting multiple search models in a plug and play environment. The architecture allows the support of different search applications built and deployed on various systems to cater to different search use cases. For example, some search applications may handle structured queries, while others accept unstructured queries, while still others accept search keys. Additionally, some search applications may be hosted by mainframe systems and others by distributed systems. The architecture also allows the searching of different data collections. For example, some legacy environments may have data stored in mainframe systems, while newer environments may have data stored in a big data ecosystem. Additionally, the architecture allows for different search algorithms and filters to be developed independently from the search application receiving the query, and the data collection searched.

A structured or unstructured query may be entered on a mainframe or distributed system. A blended search engine platform including application programming interfaces (APIs) for handling the various types of queries processes the query to initiate the appropriate search and match application for on one or both of mainframe and big data in order to respond to the query. The data architecture allows for the search and match to be performed on one or both of mainframe and big data in a more efficient and accurate manner than on legacy systems.

II. System

Figure 1:
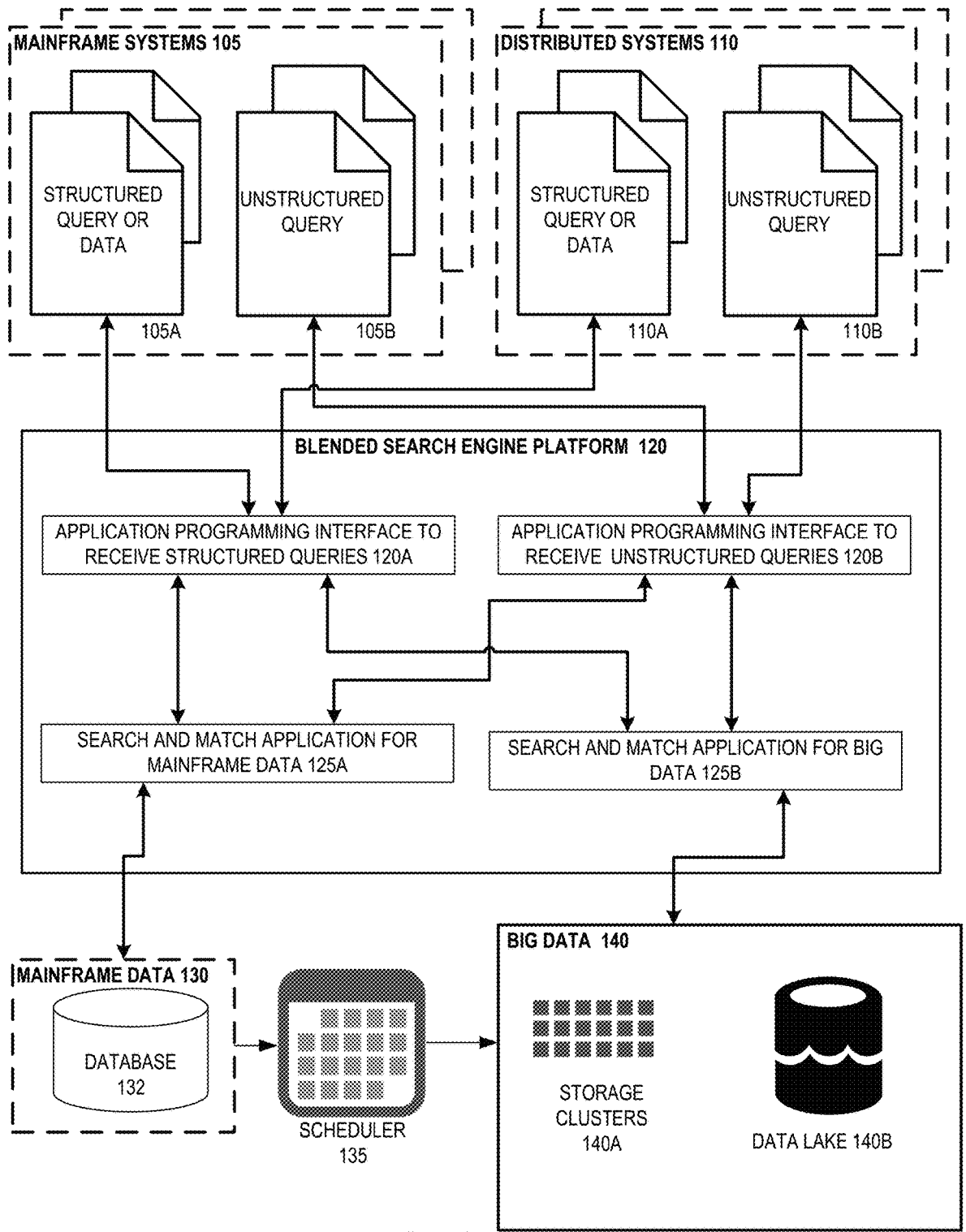
FIG. 1 is an overall system diagram depicting one embodiment of a data architecture for supporting multiple search models.

FIG. 1 is an overall system diagram depicting one embodiment of a data architecture for supporting a blended and unified search platform hosting multiple search models in a plug and play environment. The architecture includes mainframe systems 105, distributed systems 110, a blended search engine platform 120, mainframe data 130, big data 140, and a scheduler 135. In one embodiment, the various components of the architecture may communicate via one or more networks, which may include one or more of a local area network, a wide area network, the Internet, or a cloud-computing network, implemented via a wired, wireless, or combination of wired and wireless communication links.

A. Example Mainframe Systems and Distributed Systems

The architecture shown in FIG. 1 includes mainframe systems 105 receiving structured queries or data 105A and unstructured queries 105B, and distributed systems 110 receiving structured queries or data 110A and unstructured queries 110B.

In various embodiments, the mainframe systems 105 may include computers or computer system architectures used by organizations for applications including bulk data processing and/or transaction processing. A mainframe system may include a central data repository in the organization's data processing center, linked to users through workstations or terminals.

The distributed systems 110 may include a group of computers running software that communicate together so as to appear as a single local machine.

Distributed systems platforms may include multi-user, multi-tasking, time-sharing operating systems.

Mainframe and distributed systems each have their list of advantages and disadvantages. Depending on an organization's needs, both platforms may be needed or desired and different platforms may be used by requesting organizations. Therefore, the architecture disclosed herein accommodates queries and data from both mainframe systems 105 and distributed systems 110.

The queries and data may be structured (105A and 110A) or unstructured (105B and 110B). In general, as used herein, a structured query refers to a search query for structured data, whereas an unstructured query refers to a search query for unstructured data. Structured data is typically characterized in a pre-defined data format, such as with predefined fields and/or field value types. Structured data may reside in relational databases or data warehouses. Unstructured data typically has no pre-defined data formats, such as a text string, and it may reside in applications, NoSQL databases, data warehouses, or data lakes.

B. Blended Search Engine Platform

The architecture shown in FIG. 1 includes a blended search engine platform 120 including an API configured to receive structured queries 120A and an API configured to receive unstructured queries 120B, as well as search and match application for mainframe data 125A and search and match application for big data 125B.

1. Example Application Programming Interfaces

In various embodiments, the structured queries or data 105A and 110A may be received through an API configured to receive structured queries 120A. Unstructured queries 105B may be received through an API configured to receive unstructured queries 120B.

The respective APIs make it easier for the different queries to communicate with the search and match applications to search the mainframe data and the big data. In general, the use of such APIs helps support the overall architecture's goal of providing a plug and play environment. For example, if a search query is received from a new system, or if a new type of search and match application is developed, there is no need to change the whole architecture, rather the appropriate modifications are done to the respective API to accommodate for the new system and/or application.

2. Example Search and Match Applications

After a query is processed by one of the APIs 120A or 120B, the processed query is passed on to one or both of the search and match application for mainframe data 125A and/or search and match application for big data 125B based on the search rules. As will be described further below, some search rules may search mainframe data if there are missing results after searching big data.

The search and match applications for mainframe data 125A may include search logic and algorithms for searching structured data. There are many existing search and match applications such as, for example Structured Query Language (SQL).

An example of a search and match application for big data 125B used in the architecture disclosed herein is Apache Solr. Solr is an open source enterprise search platform, written in Java. Its major features include full-text search, hit highlighting, faceted search, real-time indexing, dynamic clustering, database integration, NoSQL features and rich document (for example, Word, PDF) handling. Providing distributed search and index replication, Solr is designed for scalability and fault tolerance. Solr is widely used for enterprise search and analytics use cases. Solr runs as a standalone full-text search server. It uses a Java search library at its core for full-text indexing and search, and has REST-like HTTP/XML and JSON APIs that make it usable from most popular programming languages. Solr's external configuration allows it to be tailored to many types of application without Java coding, and it has a plugin architecture to support more advanced customization. It is recognized that other big data platforms could be used.

C. Data Environments

The mainframe data 130 typically includes only structured data stored on a database 132. In various embodiments, the database 132 may be any relational database, such as for example a DB2 database.

Big data 140 is a non-relational, distributed, open-source and scalable data environment. The data environment may include a data lake 140B, with the understanding that a data lake is a massive, easily accessible centralized repository of large volumes of structured and unstructured data. An example of data lake 140B includes the Apache HBase™ database. An open-source framework for processing and analyzing the big data can be used to sift through the repository. An example of such an open-source framework is Apache Hadoop, but it is recognized that others could also be used.

D. Scheduler

The architecture disclosed herein provides the ability for search and matching on big data that includes mainframe data. This is accomplished by making the data stored on the relational database 132 available on big data. In the illustrated embodiment, a scheduler 135 and storage clusters 140A are used to port data from mainframe to big data. In some embodiments, the storage clusters 140A may be Hadoop Distributed File System (HDFS) storage clusters. Other types of storage clusters may also be used. Embodiments of a process for this transformation of data is described further below in reference to FIGS. 2C and 6.

III. Example Application

In one example, the architecture described herein may be used by support customers of a credit reporting agency's business intelligence information. The customers of the credit reporting agency wishing to access such business intelligence information may include financial institutions wishing to provide credit to businesses. Different financial institutions may want to access the credit reporting agency's products and services via different types of systems, such as mainframe systems and/or distributed systems.

The credit reporting agency may store vast amounts of historical data on businesses, stored on mainframe databases. The data is also dynamic, as companies change names, ownership, addresses, and affiliations with larger entities. Additionally, business intelligence may increasingly be available through new sources such as social media, and business intelligence may be stored in big data. The credit reporting agency platform may make the data available on the mainframe systems accessible via the big data as well.

When a financial institution wishes to access the credit reporting agency for obtaining business information on a given business entity (or for providing such business information, including, for example, recent transactions with various business entities), using the architecture described herein, the financial institution may query the credit reporting agency and be blind to what type of data environment the business intelligence is stored on. Further, the query may be received from either a mainframe or distributed system, in either a real-time, single query mode, or in a batch mode.

In order to associate business information relating to a business across multiple data environments, the credit reporting agency may, in some examples, associate a unique identifier to all data relating to the business. Then, when a query is received, the search and match applications may search one or more respective data environments for data associated with the business identifier based on the search rules. For example, if data associated with the business identifier is not found on big data, then a search may be performed on mainframe data, or a search may be performed on both mainframe and big data.

IV. Example Information Flows

Figure 2C:
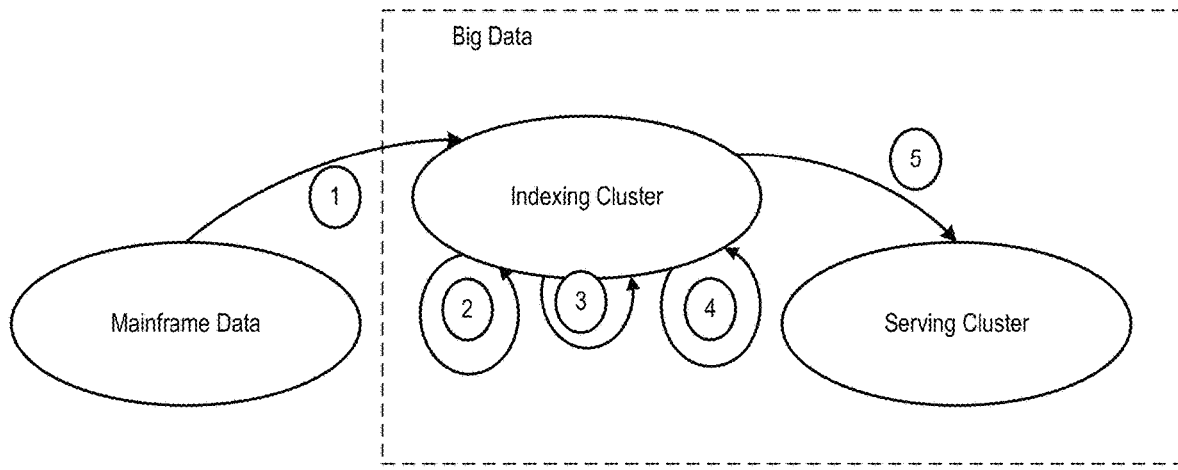

FIGS. 2A, 2B and 2C are block diagrams illustrating embodiments of information flow within the data architecture for supporting multiple search models.

A. Real-Time Query

FIG. 2A illustrates an embodiment of information flow for a single/real-time query from either a mainframe or distributed system. The information flow includes the mainframe or distributed systems 105 and/or 110, the mainframe data 130 and the big data 140, as well as the blended search engine platform 120.

As illustrated in FIG. 2A, at (1), a third party accessing the mainframe systems 105 or distributed systems 110 transmits a structured or unstructured query regarding a single business to the blended search engine platform 120. The query may be a single, real-time query from the third party. The query may include a set of fields to be used in the query such that the user submits data in one or more of the fields. In one example, the query may include Business Name, Business Address, and Business Zip Code. For example, the user may submit a business name (for example, State Farm), and an address (for example, 123 Main St., Suite 200). In another example, the user may only submit a street name (for example, Main St.). The query may also be a single field or an unstructured query where the user can submit whatever requests it wants. In one example, a user may submit a query of: "State Farm, Clovis, New Mexico, USA".

At (2), the blended search engine platform 120 determines if the query is structured or unstructured. In the first example above, the blended search engine platform 120 determines the query to be structured. In the second example, blended search engine platform 120 determines the query to be unstructured using the submitted request.

At (3), the blended search engine platform 120 processes the query with the appropriate API. In the first example above, the API for structured queries 120A is used. In the second example, the API for unstructured queries 120B is used.

At (4a), the blended search engine platform 120 launches, executes or calls search and match logic application for big data 125B to search big data 140, and at (4b), the blended search engine platform 120 also launches search and match logic application for mainframe data 125A to search mainframe data 130.

At (5a) the blended search engine platform 120 receives search results from big data 140, and at (5b), the blended search engine platform 120 receives search results from mainframe data 130.

At (6), the blended search engine platform 120 processes the search results received to determine query results for output to the third party. In other embodiments, the search results may be returned soon after received without combining with other results. The search results may need to be processed by the appropriate API for proper formatting.

At (7), the blended search engine platform 120 transmits the query results to the third party system, or makes them available to the third party system.

It is recognized that other processing may be performed and/or one or more processing steps may be omitted.

B. Batch Query

FIG. 2B illustrates an embodiment of information flow for a batch query from a mainframe system, distributed system, or other system. The information flow includes the mainframe, distributed or other systems 105 and/or 110, the mainframe data 130 and the big data 140, as well as the blended search engine platform 120.

As illustrated in FIG. 2B, at (1), a third party accessing the mainframe systems 105 or distributed systems 110 transmits a batch query in structured or unstructured form including inquiries regarding several businesses. The query may include a set of fields to be used in the query such that the user submits data in one or more of the fields. In one example, the query may include Business Name, Business Address, and Business Zip Code. For example, the user may submit a set of business names, and addresses. In another example, the user may only submit a set of street names. The query may also be a single field or an unstructured query where the user can submit whatever requests it wants. In one example, a user may submit a set of queries in the form of: "business name, city, state, USA". In various embodiments, the batch query may be a file in an Apache Avro™ format, in comma-separated values (CSV) format, or any other format.

At (2), the blended search engine platform 120 determines if the query is structured or unstructured. In the first example above, the blended search engine platform 120 determines the query to be structured. In the second example, blended search engine platform 120 determines the query to be unstructured using the submitted request.

At (3), the blended search engine platform 120 processes the query with the appropriate API. In the first example above, the API for structured queries 120A is used. In the second example, the API for unstructured queries 120B is used.

At (4a), the blended search engine platform 120 launches search and match logic application for big data 125B to search big data 140. Since the query was in batch form, the third party is likely inquiring about more than one business. The search on the big data may find certain businesses, but certain other businesses may not be found.

If necessary, that is if there are a subset of businesses for which no results are found on big data, at 4(b), the blended search engine platform launches, executes, or calls search and match logic application for mainframe data 125A to search mainframe data 130. It is recognized that other rules may be used. For example, mainframe and big data may be searched in parallel, or mainframe may be searched first, then big data.

At (5a) the blended search engine platform 120 receives search results from big data 140, and at 5(b), the blended search engine platform 120 receives search results from mainframe data 130.

At (6), the blended search engine platform 120 processes all search results received to determine query results for output to the third party. In other embodiments, the search results may be returned soon after received without combining with other results. The search results may need to be processed by the appropriate API for proper formatting.

At (7), the blended search engine platform 120 transmits the query results to the third party system, or makes them available to the third party system.

It is recognized that other processing may be performed and/or one or more processing steps may be omitted.

C. Porting of Mainframe Data

FIG. 2C illustrates an embodiment of information flow for porting mainframe data available on a big data environment. The information flow includes the mainframe data 130, the big data 140 and the scheduler 135.

As illustrated in FIG. 2C, at (1), an indexing cluster on the big data environment 140 receives data in files from the mainframe data 130. The files may include batches received on a periodic basis (such as for example, monthly, weekly, daily, hourly, and so forth, or in real-time), as well as incremental files or updates to the files received on a periodic basis.

At (2), the indexing cluster incrementally processes the data received.

At (3), the indexing cluster denormalizes the data (both the batched data, and/or the incremental data).

At (4), the indexing cluster indexes the processed and denormalized data.

At (5), the indexing cluster transmits an indexed copy of the data to the serving cluster. This transmitting may be performed via the scheduler 135 illustrated in FIG. 1.

It is recognized that other processing may be performed and/or one or more processing steps may be omitted.

V. Search and Match Application for Big Data

Figure 3A:
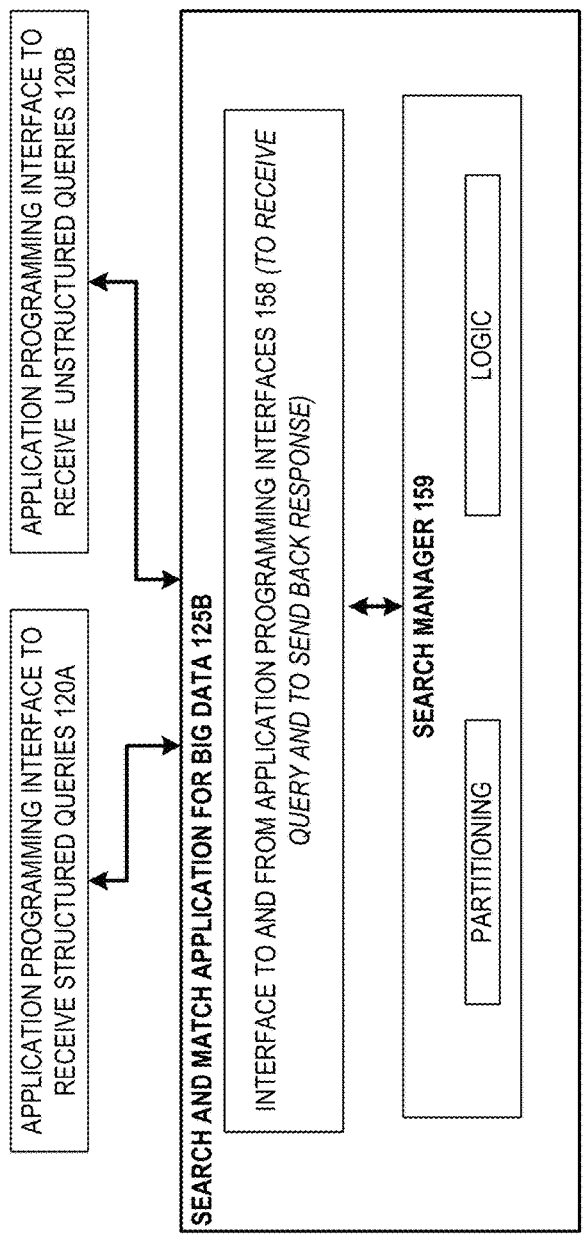
FIGS. 3A and 3B are block diagrams illustrating embodiments of a search and match application for big data.
Figure 3B:
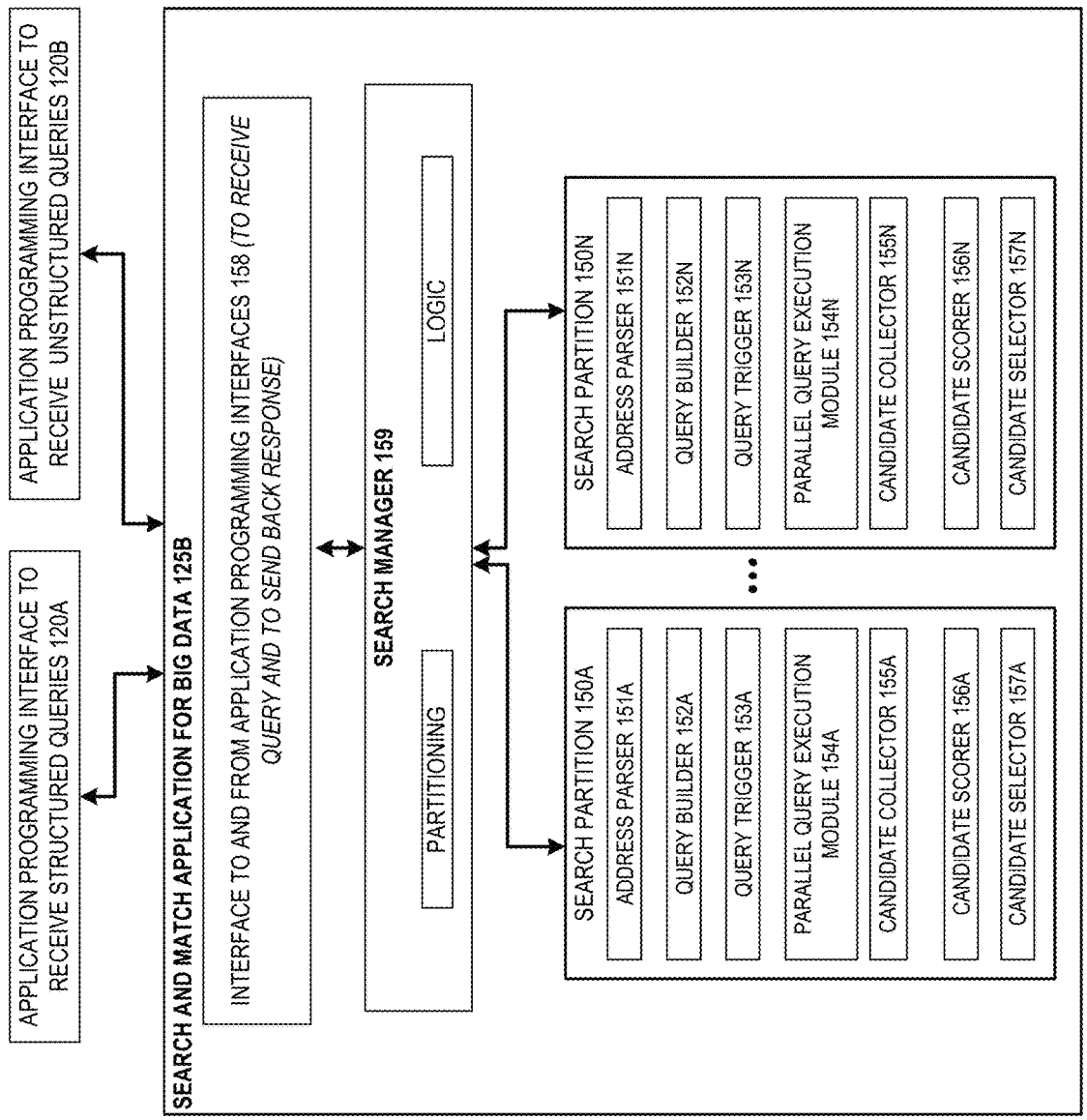

FIGS. 3A and 3B are block diagrams illustrating embodiments of a search and match application for big data. It is recognized these are examples, and that other applications may also be used.

FIG. 3A is a block diagram illustrating one embodiment of the search and match application for big data 125B without a query being initiated. As shown in FIG. 3A, the search and match application for big data 125B includes an interface 158 to communicate with the API interfaces 120A and 120B illustrated in FIG. 1. This interface 158 may be used receive structured and unstructured queries, and to return output results for transmission back to the third party.

The search and application for big data 125B also includes a search manager 159. The search manager may perform partitioning, as well as applying the logic for performing searching and matching on the big data.

A partition may include a logical chunk of a large distributed data set. The partitioning function may help parallelize distributed data processing with minimal network traffic for sending data between the search execution units. In general, smaller/more numerous partitions allow work to be distributed among more processing nodes, but larger/fewer partitions allow work to be done in larger chunks, which may result in the work getting done more quickly as long as all processing nodes are being utilized, due to reduced overhead. Increasing partitions count will make each partition to have less data (or not at all).

FIG. 3B is a block diagram illustrating one embodiment of the search and match application for big data 125B with a query being initiated. As shown in FIG. 3B, search partitions 150A through 150N are initiated following a query being received. N is a number between 0 and about X, depending on the size of the file (or the number of records) received as the batch query (or data to ingest). For example, X may be any 10, 20, 50, 100, 250, and so forth.

Each of the search partitions 150A through 150N includes an address parser 151, a query builder 152, a query trigger 153, a parallel query execution module 154, a candidate collector 155, a candidate scorer 156, and a candidate selector 157. The function of each of these modules is described in further detail below in reference to FIG. 4.

VI. Data Architecture Processes

Figure 4:
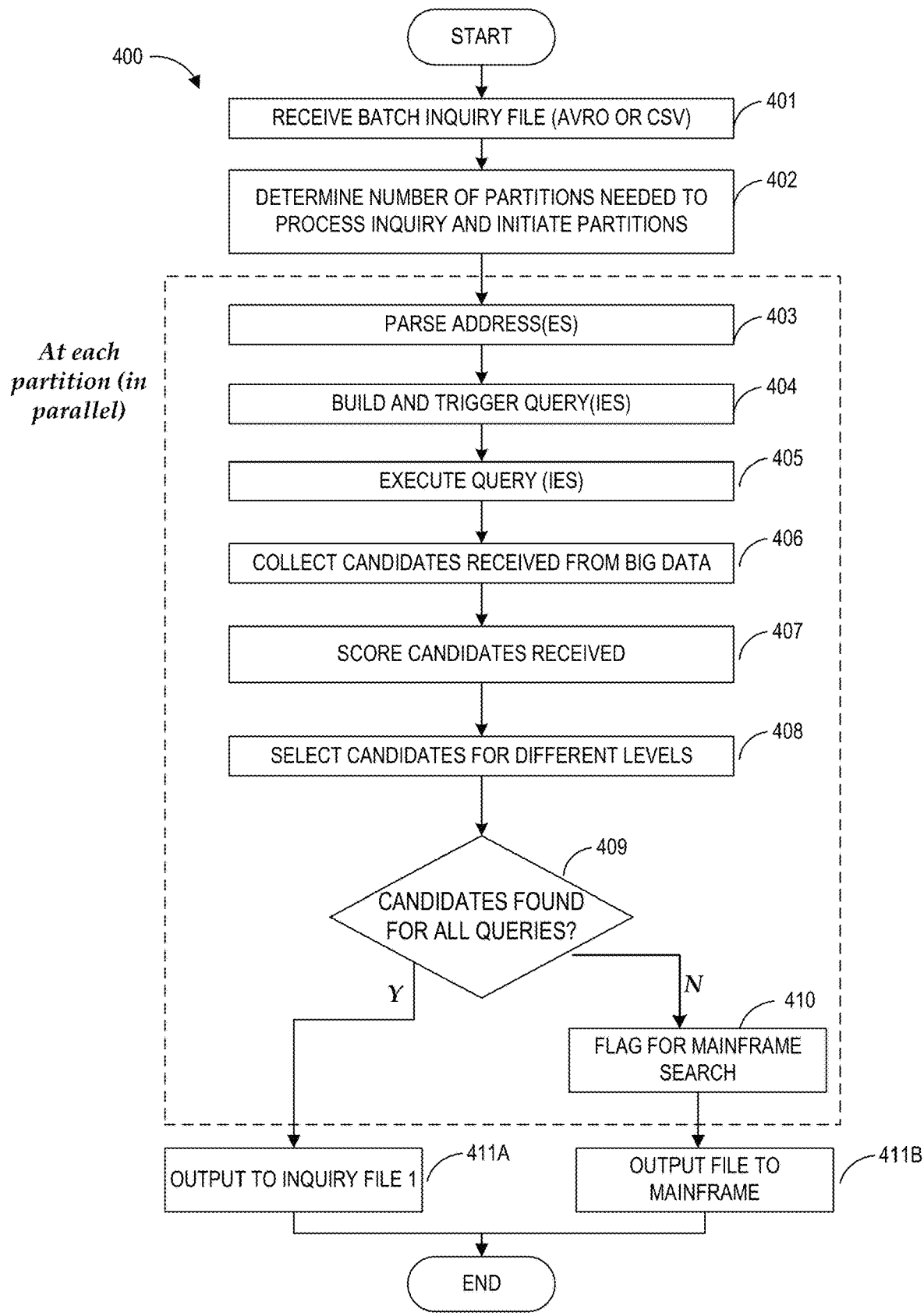
FIG. 4 is a block diagram illustrating an embodiment of a process for serving a batch search query on big data.
Figure 5:
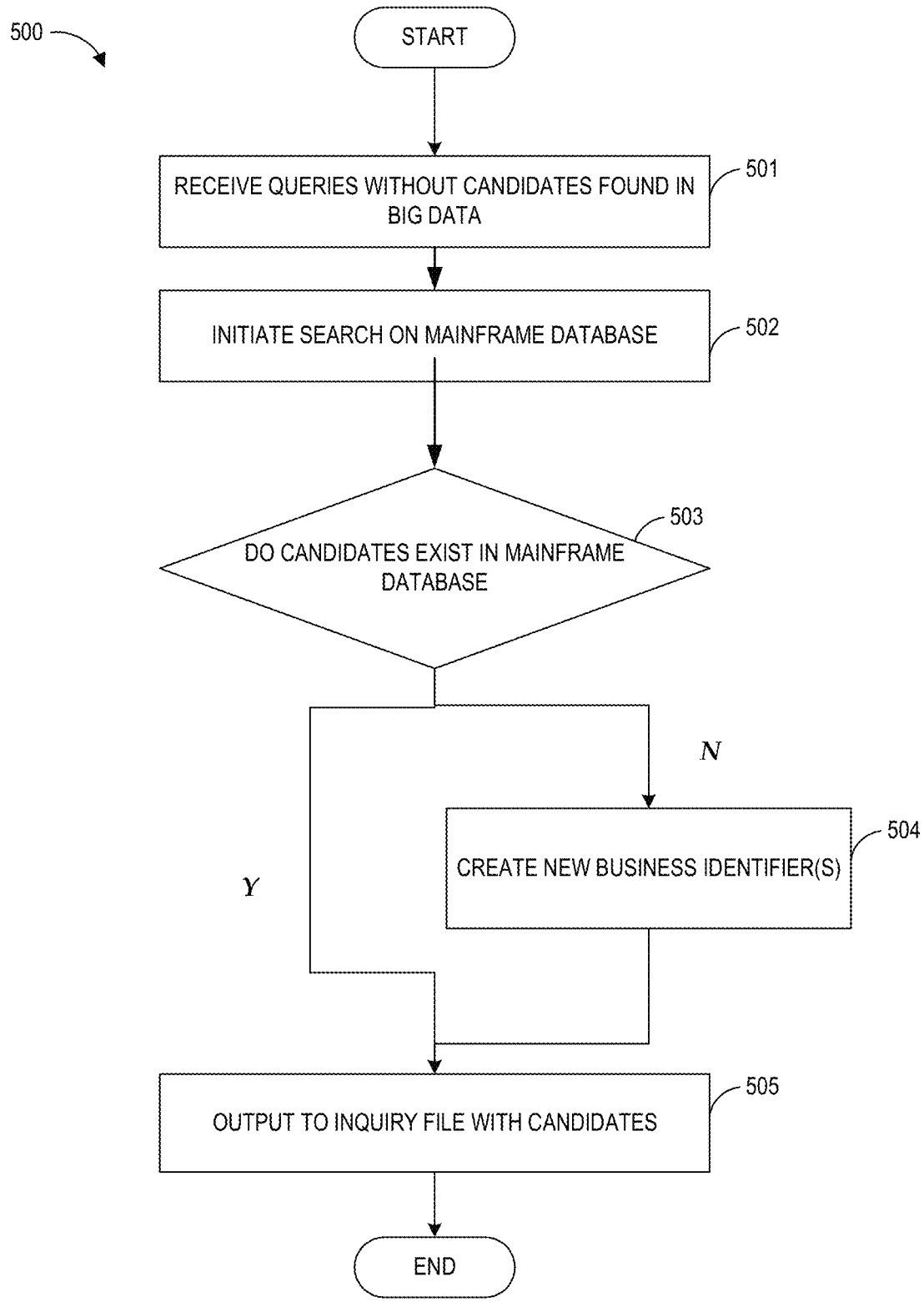
FIG. 5 is a block diagram illustrating an embodiment of a process for serving a batch search query on mainframe data.
Figure 6:
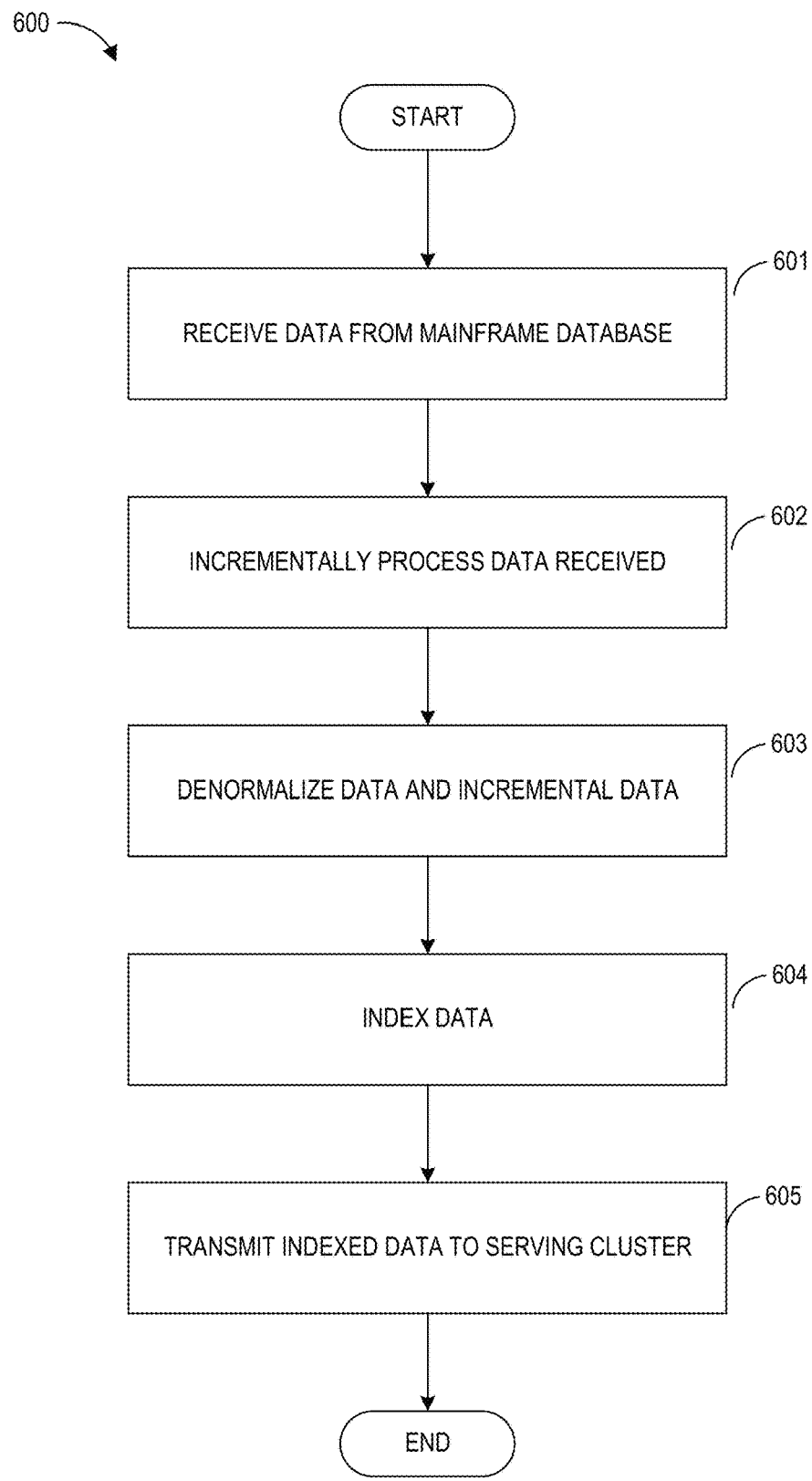
FIG. 6 is a block diagram illustrating an embodiment of a process for transmitting mainframe data to big data.

FIGS. 4, 5 and 6 are flowcharts illustrating various embodiments of processes that execute within the data architecture disclosed herein. In some embodiments, the processes illustrated in FIGS. 4 and 5 are performed by the blended search engine platform 120 and/or other components of the data architecture. In some embodiments, the process illustrated in FIG. 6 is performed by the scheduler 135 and big data 140 and/or other components of the data architecture. However, it is recognized that other components of other systems (not shown) may perform one or more of the processes. For ease of explanation, the following describes the processes as performed by the blended search engine platform 120, the scheduler 135 and big data 140. The example scenarios are intended to illustrate, but not to limit, various aspects of the computing environment. In some embodiments, the processes can vary from the illustrated flowcharts, with some blocks omitted and other added.

A. Process for Serving a Batch Search Query on Big Data

FIG. 4 is a block diagram illustrating an embodiment of a process for serving a batch search query on big data.

In block 401, the blended search engine platform 120 receives or accesses a batch inquiry file. In various embodiments, the file may be an Apache Avro™ format, in comma-separated values (CSV) format, or any other format.

In block 402, the blended search engine platform 120 determines a number of partitions needed to process the inquiry file received, and, as necessary, initiates or instantiates the appropriate number of partitions. As described above, the number of partitions may depend on the size of the inquiry file (or the number of records) received as the batch query (or data to ingest) and/or the processing capacity of each partition.

For each of the partitions initiated, the process performs blocks 403 through 410. The parallel query execution module 154 within each partition 150 ensures that the partitions are also being performed in parallel.

In block 403, the address parser 151 parses the inquiry file received to identify addresses within the data set.

In block 404, the query builder 152 builds a query based on the data received in the inquiry.

In block 405, the query trigger 153 triggers a query on the big data.

In block 406, the candidate collector 155 collects the hits (which may include matches, near-matches, or data results) found on big data based on the query triggered by the specific partition.

In block 407, the candidate scorer 156 scores each candidate collected in order to determine whether to include in output file.

In block 408, the candidate selector 157 determines which candidates to select for output, depending on the different levels defined or assigned by the third party. The levels may include closeness levels, confidence levels, or other criteria that reflects the quality of the results.

At block 409, the partition 150 determines if candidates were found for all queries triggered. If yes, in block 411A, the candidates are output to an inquiry file 1, or otherwise made available. If no, at block 410 the query is flagged for mainframe search, and at block 411B a file including all flagged queries from all partitions is output to interface 158 to communicate with the search and match application for mainframe data 125A. It is understood that in other embodiments, other rules can be used.

B. Process for Serving a Batch Search Query on Mainframe Data

FIG. 5 is a block diagram illustrating an embodiment of a process for serving a batch search query on mainframe data.

In some embodiments, the example process for serving a search query on mainframe data illustrated in FIG. 5 may be performed after the example process for serving a search query on big data illustrated in FIG. 4 is performed.

In block 501, the search and match application for mainframe data 125A receives the file or data set including the list of flagged queries from interface 158.

In block 502, the search and match application for mainframe data 125A initiates a search on the mainframe database for the queries in the list received.

At decision block 503, the search and match application for mainframe data 125A determines if there are candidates found in the mainframe data. If candidates are not found, at block 504, new business identifiers are created for the businesses in the list, and the new business identifiers are output to inquiry file at block 505, the inquiry file may also include the candidates found in the mainframe database.

C. Process for Transmitting Mainframe Data to Big Data

FIG. 6 is a block diagram illustrating an embodiment of a process for transmitting mainframe data to big data. In some embodiments, the process illustrated in FIG. 6 is performed by the scheduler 135 and components of big data 140 and/or other components of the data architecture. In some embodiments, the big data 140 system includes an indexing cluster and a serving cluster. A computer cluster may include a set of loosely or tightly connected computers that work together so that, in many respects, they can be viewed as a single system. Computer clusters may have each node configured to perform the same task, controlled and scheduled by software.

The components of a cluster may be connected to, or in electronic communication with each other through fast local area networks (LAN), with each node (computer used as a server) running its own instance of an operating system. Clusters may be deployed to improve performance and availability over that of a single computer, while being much more cost-effective than single computers of comparable speed or availability.

The indexing and serving clusters may be used in order to efficiently process searches on big data. The transmission of data from mainframe to big data is performed on an indexing cluster which is separate from a serving cluster used to process the searches. A scheduler 135, such as for example IBM Tivoli Workload Scheduler, may be used to schedule the transmission of data from the indexing cluster to the serving cluster with reduced interruptions to the performance of search and matching on the serving cluster.

At block 601, an indexing cluster on the big data environment 140 receives or accesses data in files from the mainframe data 130. The files may include batches received on a monthly basis, as well as incremental files or updates to the files received on a daily basis.

At block 602, the indexing cluster incrementally processes the data received.

At block 603, the indexing cluster denormalizes the data. The denormalizing includes both the batches of data received on a periodic basis, as well as the incremental files received on a periodic basis.

At block 604, the indexing cluster indexes the processed and denormalized data.

At block 605, the indexing cluster transmits an indexed copy of the data to the serving cluster. This transmitting may be performed via the scheduler 135 illustrated in FIG. 1.

VII. Example System Implementation And Architecture

Figure 7:
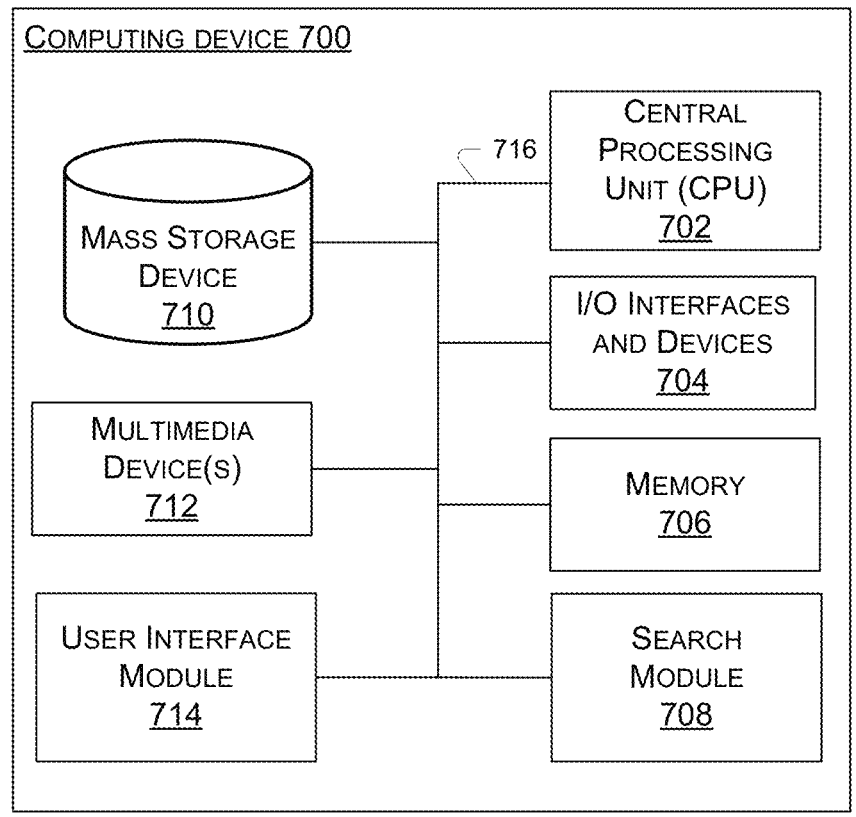
FIG. 7 is a general system diagram illustrating an embodiment of a computing system.

In some embodiments, any of the systems, servers, or components referenced herein including the blended search engine platform may take the form of a computing system as shown in FIG. 7 which illustrates a block diagram of an embodiment of a computing device 700. The computing device 700 may include, for example, one or more personal computers that is IBM, Macintosh, or Linux/Unix compatible or a server or workstation. In one embodiment, the computing device 700 comprises a server, a laptop computer, a smart phone, a personal digital assistant, a tablet, or a desktop computer, for example. In one embodiment, the illustrated computing device 700 includes one or more central processing unit (CPU) 702, which may each include a conventional or proprietary microprocessor. The computing device 700 further includes one or more memory 706, such as random access memory (RAM) for temporary storage of information, one or more read only memory (ROM) for permanent storage of information, and one or more mass storage device 710, such as a hard drive, diskette, solid state drive, or optical media storage device. The computing device 700 may also include a search module 708 which performs one or more of the processed discussed herein. Typically, the components of the computing device 700 are connected to the computer using a standard based bus system. In different embodiments, the standard based bus system could be implemented in Peripheral Component Interconnect (PCI), Microchannel, Small Computer System Interface (SCSI), Industrial Standard Architecture (ISA) and Extended ISA (EISA) architectures, for example. In addition, the functionality provided for in the components and modules of computing device 700 may be combined into fewer components and modules or further separated into additional components and modules.

The computing device 700 is generally controlled and coordinated by operating system software, such as Windows XP, Windows Vista, Windows 7, Windows 8, Windows 10, Windows Server, Unix, Linux, SunOS, Solaris, Blackberry OS, or other compatible operating systems. In Macintosh systems, the operating system may be any available operating system, such as iOS or MAC OS X. In other embodiments, the computing device 700 may be controlled by a proprietary operating system. Conventional operating systems control and schedule computer processes for execution, perform memory management, provide file system, networking, I/O services, and provide a user interface, such as a graphical user interface (GUI), among other things.

The illustrated computing device 700 may include one or more commonly available input/output (I/O) devices and interfaces 704, such as a keyboard, mouse, touchpad, and printer. In one embodiment, the I/O devices and interfaces 704 include one or more display devices, such as a monitor, that allows the visual presentation of data to a user. More particularly, a display device provides for the presentation of GUIs, application software data, reports, benchmarking data, metrics, and/or multimedia presentations, for example. The computing device 700 may also include one or more multimedia devices 712, such as speakers, video cards, graphics accelerators, and microphones, for example.

In the embodiment of FIG. 7, the I/O devices and interfaces 704 provide a communication interface to various external devices. In the embodiment of FIG. 7, the computing device 700 is electronically coupled to one or more networks, which comprise one or more of a LAN, WAN, and/or the Internet, for example, via a wired, wireless, or combination of wired and wireless, communication link. The networks communicate with various computing devices and/or other electronic devices via wired or wireless communication links, such as the ERP data sources.

In some embodiments, information may be provided to the computing device 700 over a network from one or more data sources. The data sources may include one or more internal and/or external data sources. In some embodiments, one or more of the databases or data sources may be implemented using a relational database, such as Sybase, Oracle, CodeBase, PostgreSQL, and Microsoft® SQL Server as well as other types of databases such as, for example, a flat file database, an entity-relationship database, an object-oriented database, a non-relational database, and/or a record-based database.

In general, the word "module," as used herein, refers to logic embodied in hardware or firmware, or to a collection of software instructions, possibly having entry and exit points, written in a programming language, such as, for example, Java, Lua, C, C#, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing device 700, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In the example of FIG. 7, the search module 708 may be configured for execution by the CPU 702 to perform any or all of the processes discussed herein. Depending on the embodiment, certain processes, or in the processes, or groups of processes discussed herein may be performed by multiple devices, such as multiple computing systems similar to computing device 700.

VIII. Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein, the terms "determine" or "determining" encompass a wide variety of actions. For example, "determining" may include calculating, computing, processing, deriving, generating, obtaining, looking up (for example, looking up in a table, a database or another data structure), ascertaining and the like via a hardware element without user intervention. Also, "determining" may include receiving (for example, receiving information), accessing (for example, accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (for example, transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. After obtaining, the generating may include combining the input information. The combination may be performed through specific circuitry configured to provide an output indicating the result of the generating. The combination may be dynamically performed such as through dynamic selection of execution paths based on, for example, the input information, device operational characteristics (for example, hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electromechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

The invention claimed is:

1. A system comprising:
a relational data scheme storing a first repository of a first set of data records, wherein each record is associated with a unique identifier;
a non-relational data scheme storing a second repository of a second set of data records, wherein each record is associated with a unique identifier, and wherein the second repository further includes a subset of data records associated with a subset of records in the first set of data records; and
a search and match computing system configured to receive electronic communications with a plurality of third party computing systems, the search and match computing system comprising:
a first application programming interface configured to receive structured queries;
a second application programming interface configured to receive unstructured queries;
a first search and match application configured to communicate with the first application programming interface and the second application programming interface and execute inquiries on the relational data scheme; and
a second search and match application configured to communicate with the first application programming interface and the second application programming interface and execute inquiries on the non-relational data scheme;
wherein the search and match computing system further comprises instructions, that when executed by the search and match computing system, are configured to:
access, from one of the plurality of third party computing systems, a query regarding at least one entity;
determine if a query type of the query is a structured query or an unstructured query;
process the query with the first application programming interface when the query type is determined to be the structured query or the second application programming interface when the query type is determined to be the unstructured query;
initiate the second search and match application configured to execute inquiries on the non-relational data scheme;
access first search results from the non-relational data scheme;
determine that the first search results accessed from the non-relational data scheme do not include complete information regarding the at least one entity associated with the query;
initiate the first search and match application configured to execute inquiries on the relational data scheme as to the at least one entity;
access second search results from the relational data scheme; and
process at least the second search results to generate an output for access by the one of the plurality of third party computing systems.

2. The system of claim 1, wherein the plurality of third party computing systems comprises one or more mainframe systems.

3. The system of claim 1, wherein the plurality of third party computing systems comprises one or more distributed systems.

4. The system of claim 1, wherein the first set of data records and the second set of data records include records associated with business entities.

5. The system of claim 1, wherein the second search and match application configured to execute inquiries on the non-relational data scheme comprises a search manager module configured to generate a plurality of partition tasks and to implement search logic replicated for each of the plurality of partition tasks.

6. The system of claim 1, wherein the system further comprises a scheduler, and the non-relational data scheme comprises an indexing cluster and a serving cluster, wherein the indexing cluster of the non-relational data scheme is configured to:
   receive data records from the relational data scheme;
   incrementally process the data records;
   denormalize the data records; and
   index the data records;
   wherein the scheduler is configured to transmit the indexed data records to the serving cluster on a periodic basis.

7. The system of claim 6, wherein the indexing cluster of the non-relational data scheme is configured to receive data records from the relational data scheme on a monthly basis, on a daily basis, or on a real-time basis.

8. A computer-implemented method for providing entity information, the computer-implemented method comprising, as implemented by one or more computing devices within a search and match computing system in electronic communication with a plurality of third party computing systems, the search and match computing system configured with specific executable instructions:
   receiving, from one of a plurality of third party computing systems, a query associated with at least one entity;
   determining if a query type of the query is a structured query or an unstructured query;
   processing the query with a first application programming interface configured to receive structured queries when the query type is determined to be the structured query or a second application programming interface configured to receive unstructured queries when the query type is determined to be the unstructured query;
   initiating a non-relational data search and match application configured to execute inquiries on a non-relational data scheme and to communicate with the first application programming interface and the second application programming interface, where the non-relational data scheme stores a second set of data;
   accessing non-relational data search results;
   determining that the non-relational data search results received from the non-relational data scheme do not include complete information regarding the at least one entity associated with the query;
   initiating a relational data search and match application configured to execute inquiries on a relational data scheme as to the at least one entity and to communicate with the first application programming interface and the second application programming interface, where the relational data scheme stores a first set of data;
   accessing relational data search results; and
   processing at least the relational data search results to generate an output for access by the one of the plurality of third party computing systems.

9. The computer-implemented method of claim 8, wherein the one of the plurality of third party computing systems comprises at least one of a mainframe system or a distributed system.

10. The computer-implemented method of claim 8, wherein the first set of data and the second set of data include records associated with business entities.

11. The computer-implemented method of claim 8, wherein the non-relational data search and match application comprises a search manager module configured to generate a plurality of partition tasks and to implement search logic replicated for each of the plurality of partition tasks.

12. The computer-implemented method of claim 8, wherein the non-relational data scheme comprises an indexing cluster and a serving cluster, wherein the indexing cluster of the non-relational data scheme is configured to:
   receive data records from the relational data scheme;
   incrementally process the data records;
   denormalize the data records; and
   index the data records.

13. The computer-implemented method of claim 12, wherein the indexing cluster is in communication with a scheduler configured to transmit the indexed data records to the serving cluster on a periodic basis.

14. The computer-implemented method of claim 13, wherein the indexing cluster of the non-relational data scheme is configured to receive data records from the relational data scheme on a monthly basis, on a daily basis, or on a real-time basis.

15. A non-transitory computer storage medium storing computer-executable instructions that, when executed by a processor, cause the processor to at least:
   receive, from one of a plurality of third party computing systems, a query associated with at least one entity;
   determine if a query type of the query is a structured query or an unstructured query;
   process the query with a first application programming interface configured to receive structured queries when the query type is determined to be the structured query or a second application programming interface configured to receive unstructured queries when the query type is determined to be the unstructured query;
   initiate a non-relational data search and match application configured to execute inquiries on a non-relational data scheme and to communicate with the first application programming interface and the second application programming interface, where the non-relational data scheme stores a second set of data;
   receive non-relational data search results;
   determine that the non-relational data search results received from the non-relational data scheme do not include complete information regarding the at least one entity associated with the query;
   initiate a relational data search and match application configured to execute inquiries on a relational data scheme as to the at least one entity and to communicate with the first application programming interface and the second application programming interface, where the relational data scheme stores a first set of data;
   receive relational data search results; and
   process at least the relational data search results to generate an output for access by the one of the plurality of third party computing systems.

16. The non-transitory computer storage medium of claim 15, wherein the one of the plurality of third party computing systems comprises at least one of: a mainframe system or a distributed system.

17. The non-transitory computer storage medium of claim 15, wherein the first set of data and the second set of data include records associated with business entities.

18. The non-transitory computer storage medium of claim 15, wherein the non-relational data search and match comprises a search manager module configured to generate a plurality of partition tasks and to implement search logic replicated for each of the plurality of partition tasks.

19. The non-transitory computer storage medium of claim 15, wherein the non-relational data scheme comprises an indexing cluster and a serving cluster, wherein the indexing cluster of the non-relational data scheme is configured to:
  receive data records from the relational data scheme;
  incrementally process the data records;
  denormalize the data records; and
  index the data records;
  wherein the indexing cluster is in communication with a scheduler configured to transmit the indexed data records to the serving cluster on a periodic basis.

20. The non-transitory computer storage medium of claim 19, wherein the indexing cluster of the non-relational data scheme is configured to receive data records from the relational data scheme on a monthly basis, on a daily basis, or on a real-time basis.

\* \* \* \* \*